United States Patent
Kuwabara

(10) Patent No.: US 6,210,100 B1
(45) Date of Patent: Apr. 3, 2001

(54) PUMP-TURBINE

(75) Inventor: Takao Kuwabara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/386,309

(22) Filed: Aug. 31, 1999

Related U.S. Application Data

(63) Continuation of application No. 09/031,546, filed on Feb. 27, 1998.

(30) Foreign Application Priority Data

Mar. 2, 1997 (JP) .................................................. 9-047572
Mar. 14, 1997 (JP) .................................................. 9-060428

(51) Int. Cl.[7] .................................................. F03B 15/00
(52) U.S. Cl. .................................. 415/13; 415/15; 415/16; 415/17; 415/36; 415/42; 415/50; 415/910
(58) Field of Search .................................... 415/1, 13, 14, 415/15, 16, 17, 24, 26, 42, 36, 43, 48, 50, 910

(56) References Cited

U.S. PATENT DOCUMENTS

| | | | |
|---|---|---|---|
| 4,253,794 | 3/1981 | Kuwabara | 415/1 |
| 4,267,459 * | 5/1981 | Yokoyama | 290/52 |
| 4,292,533 * | 9/1981 | Yokoyama et al. | 290/40 B |
| 4,354,800 | 10/1982 | Kuwabara | 415/1 |
| 4,382,745 | 5/1983 | Kuwabara | 415/1 |
| 4,475,334 * | 10/1984 | Kuwabara | 60/398 |
| 4,624,622 | 11/1986 | Kuwabara | 415/14 |

FOREIGN PATENT DOCUMENTS

| | | |
|---|---|---|
| 52-134949 | 11/1977 | (JP) . |
| 53-143841 | 12/1978 | (JP) . |
| 54-40946 | 3/1979 | (JP) . |
| 60-38559 | 2/1985 | (JP) . |
| 63-21033 | 1/1988 | (JP) . |
| 8-42441 | 2/1996 | (JP) . |

\* cited by examiner

*Primary Examiner*—Edward K. Look
*Assistant Examiner*—Ninh Nguyen
(74) *Attorney, Agent, or Firm*—Mattingly, Stanger & Malur

(57) ABSTRACT

An upper reservoir-side conduit or a lower reservoir-side conduit is branched in the vicinity of pump-turbine ends and at least a first pump-turbine out of a plurality of pump-turbines which share the conduit portions located farther than the branch points with the other pump-turbine or pump-turbines is provided with a rotational speed increase detector. When it is detected that the rotational speed of the first pump-turbine has exceeded a second predetermined value higher than a rated speed, a command is issued also to at least one of the other pump-turbines to limit the guide vane closing speed in that pump-turbine to a speed approximately equal to or lower than the speed after the shift to a slow closing of the guide vanes.

11 Claims, 10 Drawing Sheets

PUMP-TURBINE

This application is a continuation of Ser. No. 09/031,546, filed Feb. 27, 1998.

BACKGROUND OF THE INVENTION

1. Field of the Invention

The present invention relates to a plurality of pump-turbines wherein an upper reservoir-side conduit or a lower reservoir-side conduit is branched and the conduit portions located farther than the branch points are shared among the pump-turbines, Particularly, the invention is concerned with a plurality of pump-turbines capable of diminishing water hammer.

2. Description of the Related Art

Generally, in conventional pump-turbines, different guide vane closing speeds are set for pumping operation and generating operation, respectively. For the closing speed at each operation mode there is adopted a closing method involving a so-called gooseneck in which the closing speed is changed over to a slow closing speed automatically when guide vanes have been closed to a predetermined opening or less. The reason for this will be described below while referring to a generating operation mode shown in FIG. 7.

During a generating operation at a guide vane opening corresponding to a full load or a load close thereto, if the load of a generator connected directly to a pump-turbine is disconnected suddenly, that is, if the load is rejected, the rotational speed of the pump-turbine will rise temporarily. In an ordinary type of a pump-turbine, however, it is necessary to also fully satisfy the required characteristics in pumping operation in which the rotation is reverse, so that the diameter of each runner vane is set relatively large and some consideration is given to the runner shape so that a sufficient centrifugal force acts on water. Therefore, also in the generating operation, the influence of the centrifugal force acting on the water flowing down through the runner is serious. With an increase of the rotational speed, the amount of water entering the runner chamber decreases at a gradient which is far steeper than that in an ordinary type of a turbine, eventually leading to a reverse flow, namely the pumping flow. Thus, even without closing of the guide vanes, a mere increase in rotational speed of the turbine results in a steep gradient decrease of the turbine discharge. The higher the head of pump, the more marked this tendency. Particularly, in the case of a pump-turbine having an S-characteristic (dQ1/dN1>0, where $Q1=Q/\sqrt{H}$, $N1=N/\sqrt{H}$, Q: turbine discharge, N: rotational speed, H: effective head), the rotational speed increases, reaches a peak, then decreases, and just after this decrease there occurs a phenomenon such that the flow in the turbine direction suddenly shifts to the flow in the pump direction as if it were pulled in. This is due to a positive feedback phenomenon such that the increase of an effective head H caused by water hammer decreases the flow rate Q, giving rise to a further water hammer and causing a further increase of the effective head H, as is fully explained in Japanese Patent Laid Open No. 40946/79. As a result, the water pressure in the upper reservoir-side conduit of the pump-turbine increases abruptly. In contrast therewith, the water pressure in the lower reservoir-side conduit of the pump-turbine drops largely. If the rapid closing of guide vanes continues even at this time, this state indicates an overlapped form of the pumping action, especially a natural flow decreasing action based on the S-characteristic, with a rapid throttling effect induced by the guide vanes. This state is dangerous because the increase of water pressure in an iron penstock expands to an abnormal extent. The water pressure in the upper reservoir-side conduit rises to an abnormal extent and may exceed a designed level, while the water pressure on the lower reservoir-side drops to an abnormal extent and may cause a water column separation. The reason for this is explained in Japanese Patent Laid Open No. 143841/78, but is apparent from a complete characteristic graph of a pump-turbine shown in FIG. 8. As shown therein, closing the guide vanes while following the S-characteristic in a flow decreasing direction means that an operation point $N1=N/\sqrt{H}$ shifts in a direction in which it becomes smaller. This is because a rise of H is inevitable on the assumption that N is constant. The broken line in FIG. 7 shows an example, in which an increasing range of water pressure Hp in the upper reservoir-side conduit increases although an increasing range of rotational speed becomes a little smaller.

According to the prior art, therefore, at a guide vane opening smaller than a predetermined opening, say 80%, in the generating operation mode, the upper limit of the guide vane closing speed is set smaller than the upper limit of the closing speed at a guide vane opening of 80% or more, allowing the closing speed to shift to a slower speed and thereby allowing the guide vane closing pattern to be goosenecked as shown by line 40 in FIG. 7. For example, if there occurs a load rejection (time t0) at a guide vane opening close to 100%, the guide vanes close in a relatively rapid manner at the beginning, and at a time point ta corresponding to the arrival of the guide vanes at a preset opening Ya, the closing speed limit is changed over to a smaller value. Therefore, during the entry of an operation point into the S-characteristic and descent in the flow decreasing direction which operation point begins at the time when the rotational speed of the pump-turbine exceeds its maximum value and turns to decrease, the guide vane closing speed is limited to a relatively slow speed, whereby the foregoing abnormal increase of water pressure can be prevented. The solid line in FIG. 7 represents the state of the water pressure Hp in the iron penstock and that of the rotational speed N in the case where the guide vane closing speed is goosenecked. As means for changing the guide vane closing speed according to the guide vane opening there is used a guide vane closing speed selector. For example, such a pump-turbine protecting device as disclosed in Japanese Patent Publication No. 38559/85 is known.

In the device disclosed in the Japanese patent publication, no consideration is given to a countermeasure to be taken in the event of failure of the guide vane closing speed selector itself or of a guide vane opening detecting means. In view of this point there also has been proposed a pump-turbine in which even in the event of such failure a guide vane gooseneck equal to that responsive to the guide vane opening mentioned above is ensured to ensure the safety of the pump-turbine in the state of load rejection. This known example is disclosed in Japanese Patent Laid Open No. 42441/96, in which it is intended to ensure a guide vane gooseneck even in the event the gooseneck responsive to the guide vane opening fails to operate, thereby ensuring the pump-turbine concerned, insofar as the rotational speed of the pump-turbine is above a predetermined value in the state of load rejection.

It is known that the relation between a guide vane closing pattern in the state of load rejection and water hammer, especially the rise of the water pressure Hp in the upper reservoir-side conduit is such as that shown in FIG. 6. More specifically, if the guide vane opening Ya, which serves as a condition in changing over the guide vane closing speed from a rapid closing to a slow closing, is increased, the first peak value Hpx of the water pressure Hp in the upper reservoir-side conduit drops into Hpx1, while the second peak value Hpy rises into Hpy1. Although the waveform of the water pressure Hd in the lower reservoir-side conduit is not shown, it is such a waveform as is obtained by turning the Hp waveform upside down. The second peak value Hdy1 is lower than Hdy. The Hp waveform changes also upon change of the speed limit on the rapid guide vane closing portion. That is, if the limit is made to a gentler gradient, the first peak value Hpx drops and the second peak value Hpy rises. The most typical example is the case where the rapid closing speed is equal to a slow closing speed lower than the gooseneck point. As explained in Japanese Patent Laid Open No. 40946/79 and as will be seen from the foregoing, the first peak value can be adjusted by adjusting the gooseneck opening and limiting the rapid closing speed, but as to the second peak value, it is very difficult to control it because it results from the operation point being pulled naturally into the S-characteristic. That is, the water pressure Hpy in the upper reservoir-side conduit is allowed to take its own course and it is very difficult to control it. Particularly, in the case where a plurality of pump-turbines having the S-characteristic share conduits as in FIG. 2, they undergo a water-hammer interference with each other through the common portions of the conduits, so it is difficult to estimate the value of the water pressure Hpy in the upper reservoir-side conduit in the case where the loads on the plural pump-turbines are rejected successively with a time difference.

It is by no means possible to test all the cases of innumerable combinations in the field, so as to the time difference load rejection, it relies on simulation analysis. However, the S-characteristic itself measured by a pump-turbine model test involves a problem in point of accuracy and so it is impossible to expect a high accuracy. After all, a design is made so as to avoid such a setting as induces an increase of the second peak value of water pressure on the upper reservoir-side like the dotted line in FIG. 6 resulting from a load rejection in a single pump-turbine and so as to make the first peak value sufficiently high like the solid line, at least bring it to the same level as the second peak value. In this case, a consideration is given so that no matter how high the Hpy in time difference load rejection rises abnormally due to mutual interference, it does not exceed Hpx Σ in the state of simultaneous load rejection of plural pump-turbines which share a conduit and so that a possible maximum water pressure is controlled at the first peak value which can be controlled, not allowing it to take its own course in accordance with the S-characteristic. Usually, if only the relation of Hpx>Hpy is satisfied in the state of load rejection of a single pump-turbine, the relation of Hpx Σ>Hpy Σ is retained also at the time of simultaneous rejection of full load (of course, Hpx Σ in simultaneous full load rejection>Hpx in single machine load rejection). The above prior art still involves the problem that even if the guide vane closing pattern is set so as to meet the relation of Hpx>Hpy like the solid line in FIG. 6 in the state of single machine load rejection, if both are close to each other, there is no guarantee of preventing the increase of the second peak and reversal at the time of load rejection with a time difference. Rather, in the case where the guide vane closing pattern is set so as to meet the relation of Hpx<Hpy in the state of a single machine load rejection, the maximum value Hpy of the water pressure in the upper reservoir-side conduit relies completely on the S-characteristic, so that the possibility of the water pressure in the upper reservoir-side conduit at the time of load rejection with a time difference exceeding the maximum value Hpy Σ in the state of full load rejection becomes higher.

As the method for detecting that the point of operation is following the S-characteristic in the flow decreasing direction, there is known such a method as disclosed in Japanese Patent Publication No. 21033/88. For example, the detection is made on the basis of an AND condition of $dN/dt<0$ and $d2 N/dt2<0$ and an AND condition of $dN/dt<0$ and $N>Na$.

In Japanese Patent Laid Open No. 134949/77 there is shown an example of a water hammer interference diminishing method for plural pump-turbines sharing conduits. According to this known method, while the load of a certain pump-turbine is rejected and the guide vanes thereof are closing rapidly, a limitation is made on the guide vanes of the other pump-turbines which share conduits so as to close slowly. However, this known method lacks the understanding that the abnormal water-hammer interference is based on the S-characteristic. The operation monitoring item in the pump-turbines other than the pump-turbine concerned is limited to only the guide vane closing speed. As a matter of course, the monitor items proposed in the present invention such as monitoring approach of other machines to the S-characteristic or the state of following the S-characteristic in the flow decreasing direction are not disclosed in the aforesaid unexamined publication. According to the known method in question, the simultaneous rapid closing of the guide vanes in plural pump-turbines sharing conduits cannot be done even in the absence of any fear of danger.

At present there is no appropriate measure against an abnormal water-hammer interference based on the S-characteristic occurring among plural pump-turbines which share conduits, particularly an abnormal rise of Hpy (abnormal drop of Hdy) in the state of load rejection with a time difference. Therefore, this point is to be improved. Besides, although an appropriate consideration has not been given to the S-characteristic and hence it has so far been impossible to minimize water hammer, the present invention permits the minimization of water hammer, namely the improvement of design water pressure in the upper and lower reservoir-side conduits and pump-turbine devices.

SUMMARY OF THE INVENTION

It is an object of the present invention to solve the above-mentioned problems, that is, clarify the mechanism of the abnormal water-hammer interference based on the S-characteristic and occurring among plural pump-turbines which share conduits, and provide an appropriate and inexpensive countermeasure for rationally solving the problem of abnormal rise of Hpy in the state of load rejection with a time difference and for preventing the occurrence of water hammer exceeding the water hammer in the simultaneous load rejection. Then, it is intended to provide a method for minimizing the water hammer itself in the simultaneous load rejection. Further, it is intended to permit the rationalization of design of each of plural pump-turbines sharing conduits and make the delving depth shallow around each pump-turbine relative to the level of the lower reservoir.

According to the present invention, in order to achieve the above-mentioned objects, each of plural pump-turbines sharing conduits is provided with a rotational speed increase detector and an automatic guide vane closing speed limiter. The rotational speed increase detector detects whether the rotational speed of the pump-turbine concerned exceeds a predetermined value higher than a rated speed. With this detector, it is intended to judge whether the decrease of flow rate has become larger with an increase of rotational speed after load rejection and reached a level of rotational speed at which it is judged dangerous to continue a rapid closing of the guide vanes, or the operation point has entered the S-characteristic and is following the same characteristic in the flow decreasing direction. On the other hand, the automatic guide vane closing speed limiter permits an automatic change-over from a rapid closing speed of guide vanes to a slow closing speed or from the latter to the former in accordance with a command issued from a distant place. Then, no matter which of the rotational speed increase detectors in the plural pump-turbines may operate, the detected signal is fed to each of the other pump-turbines sharing conduits to operate the automatic guide vane closing speed limiters in the other pump-turbines, thereby placing a closing speed limitation on their guide vanes unconditionally. The same effect as above is obtained also in the case where only a certain pump-turbine out of the plural pump-turbines has the rotational speed increase detector and the automatic guide vane closing speed limiter. As disclosed in Japanese Patent Laid Open No. 42441/96, if the operation of the rotational speed increase detector leads to operation of the guide vane closing speed limiter in the pump-turbine concerned and if the rotational speed increase detector can be used in this manner, it is efficient.

Further, the present invention proposes not only providing the above limitation on the guide vane closing speed responsive to the rotational speed between the pump-turbines but also positively adopting a method of setting the second peak value in waveform of the water pressure Hp in the upper reservoir-side conduit in a single machine load rejection equal to or rather higher than the first peak value Hpx. By so doing, even no matter how high the second peak value Hpy may be set relative to the first peak value Hpx, a consideration can be given to only the minimization of Hp in the simultaneous load rejection (irrespective of which of Hpx Σ and Hpy Σ is higher) without caring for the detrimental water hammer interference at the time of load rejection with a time difference. Thus, it becomes possible to make a wasteless design of the entire plant in comparison with the prior art. Particularly, according to the prior art as mentioned above, since a margin is given such as making the first peak value Hpx sufficiently higher than the second peak value Hpy for fear of the detrimental water hammer interference, it is possible to make improvement at least for the margin.

The foregoing rotational speed increase detector may be substituted for by a detector which inputs at least a rotational speed and which detects whether the pump-turbine concerned is approaching the S-characteristic or is following the S-characteristic in the flow decreasing direction with an increase of rotation caused by load rejection.

According to the present invention, in order to achieve the foregoing objects, there are provided a plurality of pump-turbines wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a load is rejected, the guide vanes are closed in a relatively rapid manner at the beginning and thereafter shift to a predetermined slow closing at least once, and wherein at least a first pump-turbine out of the plural pump-turbines is provided with a rotational speed increase detector, and when it is detected that the rotational speed of the first pump-turbine has exceeded a second predetermined value higher than a rated speed, a command is issued to at least one of the plural pump-turbines other than the first pump-turbine to limit the guide vane closing speed in the that pump-turbine to a speed approximately equal to or lower than the speed after the shift to the slow closing.

According to the present invention, in order to achieve the foregoing objects, there also are provided a plurality of pump-turbines wherein an upper reservoir-side conduit or a lower reservoir-side conduit is branched, the conduit portions located farther than the branch points are shared among the pump-turbines, the pump-turbines are each provided with guide vanes, and there is adopted a multi-stage closing method for the guide vanes such that when a load is rejected, the guide vanes are closed in a relatively rapid manner at the beginning and thereafter shift to a predetermined slow closing at least once, and wherein at least a first pump-turbine out of the plural pump-turbines is provided with a detector which inputs at least a rotational speed, and when the detector has detected that the first pump-turbine is in a range influenced by an S-characteristic ($dQ1/dN1>0$, where $Q1=Q/\sqrt{H}$, $N1=N/\sqrt{H}$, Q: turbine discharge, N: rotational speed, H: effective head), a command is issued also to at least one of the plural pump-turbines other than the first pump-turbine to limit the guide vane closing speed in that pump-turbine to a speed approximately equal to or lower than the speed after the shift to the slow closing.

According to the present invention, in order to achieve the foregoing objects, there also are provided a plurality of pump-turbines wherein an upper reservoir-side conduit or a lower reservoir-side conduit is branched, the conduit portions located farther than the branch points are shared among the pump-turbines, the pump-turbines are each provided with guide vanes, and there is adopted a multi-stage closing method for the guide vanes such that when a load is rejected, the guide vanes are closed in a relatively rapid manner at the beginning and thereafter shifts to a predetermined slow closing at least once, and wherein the plural pump-turbines are each provided with a rotational speed increase detector, and when it is detected that the rotational speed of a pump-turbine has exceeded a second predetermined value higher than a rated speed, a command is issued also to each of the other pump-turbines than the pump-turbine concerned to limit the guide vane closing speed to a speed approximately equal to or lower than the speed after the shift to the slow closing.

According to the present invention, in order to achieve the foregoing objects, there also are provided a plurality of pump-turbines wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes and possess an S-characteristic ($dQ1/dN1>0$, where $Q1=Q/\sqrt{H}$, $N1=N/\sqrt{H}$, Q: turbine discharge, N: rotational speed, H: effective head), there is adopted a multi-stage closing method for the guide vanes such that when a full load in a single machine is rejected, the guide vanes are closed rapidly at the beginning and thereafter shift to a predetermined slow closing at least once. Further, a peak value of water pressure in the upper reservoir-side conduit occurring in the rapid closing is compared with another peak value of water pressure in the upper reservoir-side conduit caused by influence of the S-characteristic just after the pump-turbine concerned has reached a peak of its rotational speed, and the rapid closing speed, the slow closing speed, and shifting conditions from the rapid closing to the slow closing, are set in such a manner that the latter peak value becomes equal to or higher than the former peak value, and wherein at least a first pump-turbine out of the plural pump-turbines is provided with a rotational speed increase detector, and when it is detected that the rotational speed of the first pump-turbine has exceeded a second predetermined value higher than a rated speed, a command is issued also to at least one of the plural pump-turbines other than the first pump-turbine to limit the guide vane closing speed to a speed approximately equal to or lower than the speed after the shift to the slow closing.

According to the present invention, in order to achieve the foregoing objects, there are further provided a plurality of pump-turbines wherein an upper reservoir-side conduit or a lower reservoir-side conduit is branched in the vicinity of pump-turbine ends, the conduit portions farther than the branch points are shared among the pump-turbines, the pump-turbines are each provided with guide vanes and possess an S-characteristic (dQ1/dN1>0, where Q1=Q/√H, N1=N/√H, Q: turbine discharge, N: rotational speed, H: effective head), there is adopted a multi-stage closing method for the guide vanes such that when a full load in a single machine is rejected, the guide vanes are closed rapidly at the beginning and thereafter shift to a predetermined slow closing at least once. Further a peak value of water pressure in the upper reservoir-side conduit occurring in the rapid closing is compared with another peak value of water pressure in the upper reservoir-side conduit caused by influence of the S-characteristic just after the pump-turbine concerned has reached a peak of its rotational speed, and the rapid closing speed, the slow closing speed, and shifting conditions from the rapid closing to the slow closing, are set in such a manner that the latter peak value becomes equal to or higher than the former peak value, and wherein at least a first pump-turbine out of the plural pump-turbines is provided with a detector which inputs at least a rotational speed, and when the detector has detected that the first pump-turbine is in a range influenced by the S-characteristic, a command is issued also to at least one of the plural pump-turbines other than the first pump-turbine to limit the guide vane closing speed in that pump-turbine to a speed approximately equal to or lower than the speed after the shift to the slow closing.

According to the present invention, in order to achieve the foregoing objects, there are further provided a plurality of pump-turbines, the plural pump-turbines being each provided with a guide vane opening detecting means which outputs a signal when the guide vane opening has become smaller than a predetermined opening, a guide vane control means for controlling the opening and closing of the guide vanes in accordance with a comparison between a target opening signal given by a calculating section of a governor and an actual opening signal of the guide vane detected, a third limiting means for limiting the upper limit of the closing speed of the guide vanes to a third predetermined value, and a fourth limiting means for limiting the upper limit of the guide vane closing speed to a fourth predetermined value lower than the third predetermined value, and wherein at least a first pump-turbine out of the plural pump-turbines is provided with a detector which inputs a rotational speed, and there is further provided a fifth limiting means which issues a command also to at least one of the plural pump-turbines other than the first pump-turbine when the detector has detected that the first pump-turbine is in a range influenced by an S-characteristic (dQ1/dN1>0, where Q1=Q/√H, N1=N/√H, Q: turbine discharge, N: rotational speed, H: effective head), to limit the upper limit of the guide vane closing speed in that pump-turbine to the fourth predetermined value or a fifth predetermined value close thereto.

It is desirable for the rotational speed increase detector used in the invention to be set so as to not only monitor whether the absolute value of a flow decrease rate (dQ/dt) in the pump-turbine concerned exceeds a predetermined value, which value is used as a criterion for an increase to the extent of inducing a detrimental water hammer interference for the other pump-turbines sharing a conduit, as the rotational speed of the pump-turbine concerned increases and the operation point thereof approaches the S-characteristic (where dN/dt>0), (the most practical monitor corresponding to or as a substitute for the monitor is N>Na), but also monitor whether the operation point of the pump-turbine concerned is following the S-characteristic in the flow decreasing direction. This state gives rise to a detrimental water hammer interference for the other pump-turbines sharing a conduit and can be detected by combining dN/dt<0 with N>Na' as noted previously. Generally, this can be done, because a sign condition of dN/dt can be excluded if the rotational speed increase detector performs both such monitors. Both states mentioned above are main factors of causing a detrimental water hammer interference to the other pump-turbines sharing a conduit.

Of the above two main factors, the latter, that, following the S-characteristic in the flow decreasing direction, exerts a more serious influence in general. It is therefore significant to monitor whether the operation point is within the range influenced by the S-characteristic.

Methods which monitor directly or indirectly only the latter are explained above. For directly detecting the latter, namely the state wherein the operation point is following the S-characteristic in the flow decreasing direction, several method have heretofore been proposed, as disclosed in Japanese Patent Publication No. 21033/88 for example. From a rotational speed increasing curve after load rejection obtained beforehand by calculation or measurement, the timing at which the operation point follows the S-characteristic in the flow decreasing direction can be estimated approximately according to a load. Therefore, it may be effective to adopt a method which detects the state in question by, for example, setting a timer according to a load. Thus, upon occurrence of a state in which the pump-turbine concerned is anxious about an abnormal water hammer interference, if a command is issued to each of the other pump-turbines sharing conduits to change the guide vane closing speed into a slower speed automatically, the rapid closing is blocked no matter when the loads in the other machines may be rejected and no matter when the guide vane closing may start, so that an excessive water hammer interference (one exceeding an interference which can occur at least in the simultaneous load rejection) does not act on the machine concerned from the other machines. Since conduits are shared among the pump-turbines, as the H of the machine concerned increases with an increase in H of the other machines, the N1=N/√H of the machine concerned decreases. This is because assuming that the machine concerned is following the S-characteristic in the flow decreasing direction, this state emphasizes the S-characteristic pulling-in action. The slow speed after change-over referred to above is not specially limited if only it is substantially lower than the rapid closing speed just after load rejection in the prior art. Of course, it is convenient to set the slow speed in question equal to the slow closing speed at Y<Ya in the prior art because this permits a combined use.

It is preferable that all the pump-turbines sharing conduits possess the guide vane gooseneck responsive to the rotational speed between the above pump-turbines. However, even when only some of the pump-turbines possess such gooseneck, a certain degree of effect can be expected.

In the case where each of pump-turbines sharing a conduit possesses a rotational speed responsive gooseneck as a backup for a guide vane responsive goosenecking device as in Japanese Patent Laid Open No. 42441/96, the present invention can be accomplished by adding control of rotational speed increase detector signals between pump-turbines as in FIG. 1.

Further, what is to be noted is that according to the present invention, no matter how high the second peak value Hpy may be set relative to the first peak value Hpx, a consideration can be given mainly to the minimization (irrespective of which of Hpx $\Sigma$ and Hpy $\Sigma$ is the higher) of Hp in the simultaneous load rejection without any fear of a detrimental water hammer interference in load rejection with a time difference, thus permitting a wasteless and economic design of the entire plant in comparison with the prior art. Particularly, in the prior art, a margin is given such as making the first peak value Hpx sufficiently higher than the second peak value Hpy for fear of the detrimental water hammer interference, as noted previously. Therefore, at least for this margin, it becomes possible to effect improvement. This indicates the possibility of reducing the design pressure in the upper reservoir-side conduit and that in the runner chamber of each pump-turbine. In the lower reservoir-side conduit, moreover, the possibility of water column separation is diminished, whereby it is possible to make shallow the pump-turbine installing position relative to the water level in the lower reservoir which has so far been set deep for fear of water column separation, thus giving rise to the possibility of a great reduction of the expenses for civil engineering works.

It goes without saying that the improvement of reliability can be attained by making the rotational speed increase detector completely independent of such speed detectors of the governor itself as SSG (Speed Signal Generator) and PMG (Permanent Magnet Generator).

Once the conditions of the limitation on the guide vane closing speed between pump-turbines in the present invention have been established, a distributing valve for a guide vane servomotor is operated on to limit the amount of pressure oil to and from the guide vane servomotor, like the rotational speed responsive gooseneck as a backup for a guide vane responsive goosenecking device disclosed in Japanese Patent Laid Open No. 42441/96. As a concrete example of this method there is known a method wherein the displacement of a distributing valve plunger is limited mechanically.

Reference will now be made mainly to a hardware portion of the device proposed in Japanese Patent Laid Open No. 42441/96.

In the case that it is assumed that each of the plurality of pump-turbines has, as a first control means, a guide vane opening rate detector means for outputting a signal when the guide vane shows an opening rate less than a predetermined opening rate, and also has, as a second control means, a guide vane control means for controlling an opening or closing of the guide vane in response to a deviation between a target opening rate give form a calculating section of the governor and the opening rate of the guide vane at that time, the guide vane opening detecting means (detection of Y>Ya) does not output a signal, at a guide vane opening above a predetermined opening, and the third limiting means limits the upper limit of the guide vane closing speed to the third predetermined value. When there occurs a load rejection in this state and a command is issued to close the guide vanes, the governor opening/closing control means drives the guide vane opening/closing means to start closing of the guide vanes. At this time, the upper limit of the guide vane closing speed is limited to the third predetermined value by the third limiting means. As the closing of the guide vanes proceeds and the guide vane opening reaches a preset opening, the guide vane detecting means outputs a signal to start up the fourth limiting means, which in turn limits the upper limit of the guide vane closing speed to a range not exceeding the fourth predetermined value smaller than the third predetermined value. For example, when the guide vane detecting means begins to output a signal indicating that the guide vane opening has become smaller than the preset opening, if the guide vane closing speed is of a value exceeding the fourth predetermined value, the fourth limiting means forces the opening/closing control means to suppress the guide vane closing speed to a value not exceeding the fourth preset value.

As shown in FIG. 5, the increase in rotational speed N of each pump-turbine after load rejection proceeds with closing of the guide vanes. Therefore, the pump-turbine rotational speed Na upon arrival of the guide vane opening at Ya can be checked by test in advance. Of course, an approximate estimate can be done by simulation even without conducting a test. As the closing of the guide vanes proceeds and the rotational speed of the pump-turbine concerned increases gradually, and when a signal indicating that the rotational speed of the pump-turbine exceeds a preset value higher than the rated rotational speed is outputted from the rotational speed increase detector, the operation of the fifth limiting means is started. Like the fourth limiting means, the fifth limiting means limits the upper limit of the guide vane closing speed to the fourth predetermined value smaller than the third predetermined value or a value close thereto. The fifth limiting means acts on the opening/closing control means in parallel with the fourth limiting means, and even in the event the fourth limiting means should fail to operate normally for some reason or other, the fifth limiting means operates independently of the fourth limiting means, so that a desired guide vane gooseneck closing is ensured and the guide vanes can be closed safely.

According to the method usually adopted for opening and closing the guide vanes, an opening/closing means such as a servomotor for example is driven with a pressure oil. In this method, the amount of the pressure oil to be fed to the servomotor is controlled using a flow control valve to control the guide vane opening/closing speed. The control for the amount of the pressure oil to be fed is made by movement of a valve stem of the flow control valve. More specifically, when the valve stem is located at a neutral position, the flow rate of pressure oil is zero, that is, the closing speed is zero, and when the amount of movement of the valve stem from the neutral position to one side (for example the lower side) is large, the flow rate of pressure oil becomes larger and the closing speed increases, while when the amount of movement of the valve step to the other side (for example the upper side) from its neutral position is large, the flow rate of pressure oil becomes larger in the opposite direction and the opening speed increases. Thus, by placing a limitation on the amount of movement of the valve stem it becomes possible to limit the flow rate of pressure oil and thereby limit the closing speed. In more particular terms, by providing means for stopping the movement of the valve stem and by making the stop position changeable it becomes possible to realize the gooseneck in the guide vane closing speed. This is an outline of the hardware portion disclosed in Japanese Patent Laid Open No. 42441/96.

DETAILED DESCRIPTION OF THE PREFERRED EMBODIMENTS

An embodiment of the present invention will be described herein under with reference to FIGS. 1 to 7.

Figure 1:
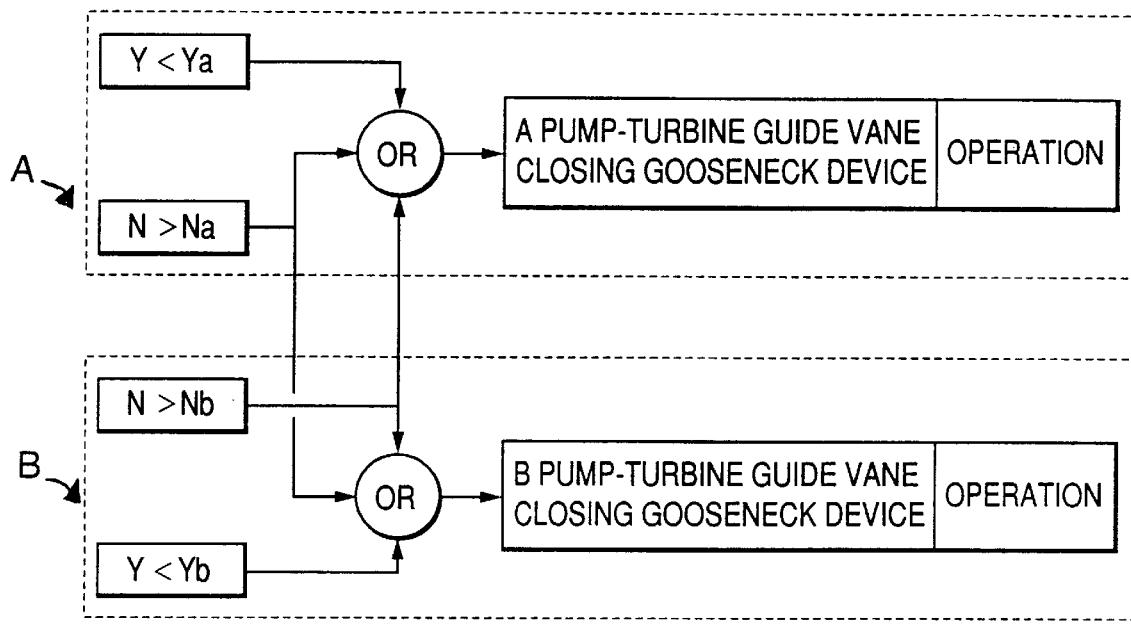
FIG. 1 is a functional diagram showing an embodiment of the present invention.

FIG. 1 is a diagram explaining the logic of the present invention, in which are shown two pump-turbines A and B as a plurality of pump-turbines sharing conduits. Both pump-turbines are each provided with a guide vane closing speed limiting device (goosenecking device). The goosenecking device of the pump-turbine A operates if any one of the following three conditions is established—the guide vane detector in the pump-turbine A detects Y<Ya, the rotational speed increase detector in the pump-turbine A detects N>Na, and the rotational speed increase detector in the other machine B detects N>Nb—. There also maybe adopted a method wherein there are provided a plurality of closing speed limiters, and the closing speed limit value for the goosenecking device which operates when the guide vane detector in the pump-turbine A detects Y<Ya, the closing speed limit value for the goosenecking device which operates when the rotational speed increase detector in the pump-turbine A detects N>Na, and the closing speed limit value for the goosenecking device which operates when the rotational speed increase detector in the pump-turbine B as the other machine detects N>Nb, are set separately. Even if the N>Na detecting condition by the rotational speed increase detector in the pump-turbine A is deleted from among the above three conditions for the pump-turbines and there is adopted a combination of the residual two conditions, the gist of the invention is attained.

Figure 2:
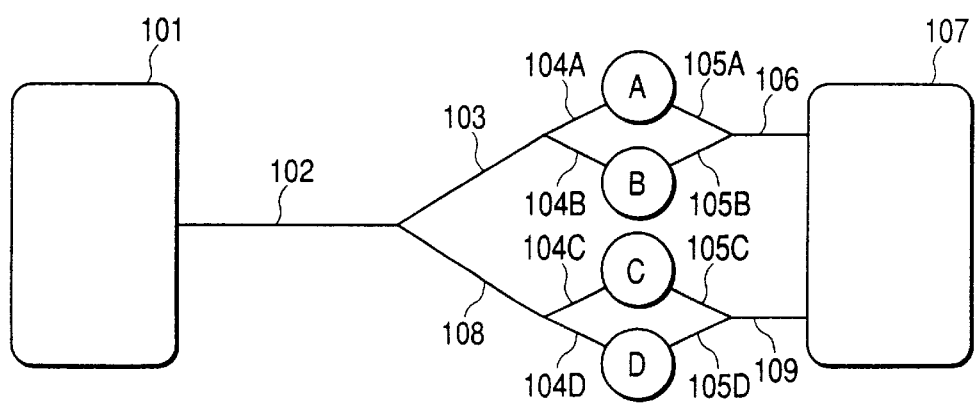
FIG. 2 is a diagram showing an example of plural pump-turbines sharing conduits according to the present invention.

FIG. 2 illustrates four pump-turbines sharing both upper and lower reservoir-side conduits according to the present invention. In the same figure, the numeral 101 denotes an upper reservoir, numeral 102 denotes an upper reservoir-side conduit portion common to the four pump-turbines, numerals 103 and 108 denote upper reservoir-side conduit portions each common to two pump-turbines, numerals 104A to 104D denote upper reservoir-side conduit connections to the pump-turbines, numerals 105A to 105D denote lower reservoir-side conduit connections to the pump-turbines, numerals 106 and 109 denote lower reservoir-side conduit portions each common to two pump-turbines, and numeral 107 denotes a lower reservoir. During the generating operation of the machine A, the water in the upper reservoir 101 is conducted to the machine A through the upper reservoir-side conduits 102, 103 and 104A, then the water leaving the machine A passes through the connections 105A, 106 and reaches the lower reservoir 107. Conversely, during the pumping operation of the machine A, the water in the lower reservoir 107 is pumped up into the upper reservoir 101. There is a difference in water level between the upper and lower reservoirs,. so during the generating operation, the machine A plays the role of converting a potential energy of the flowing-down water into an electrical energy and taking out the electrical energy. Conversely, during the pumping operation, the electrical energy is consumed into a potential energy of water which is pumped up, and the potential energy is stored in the upper reservoir.

Figure 3:
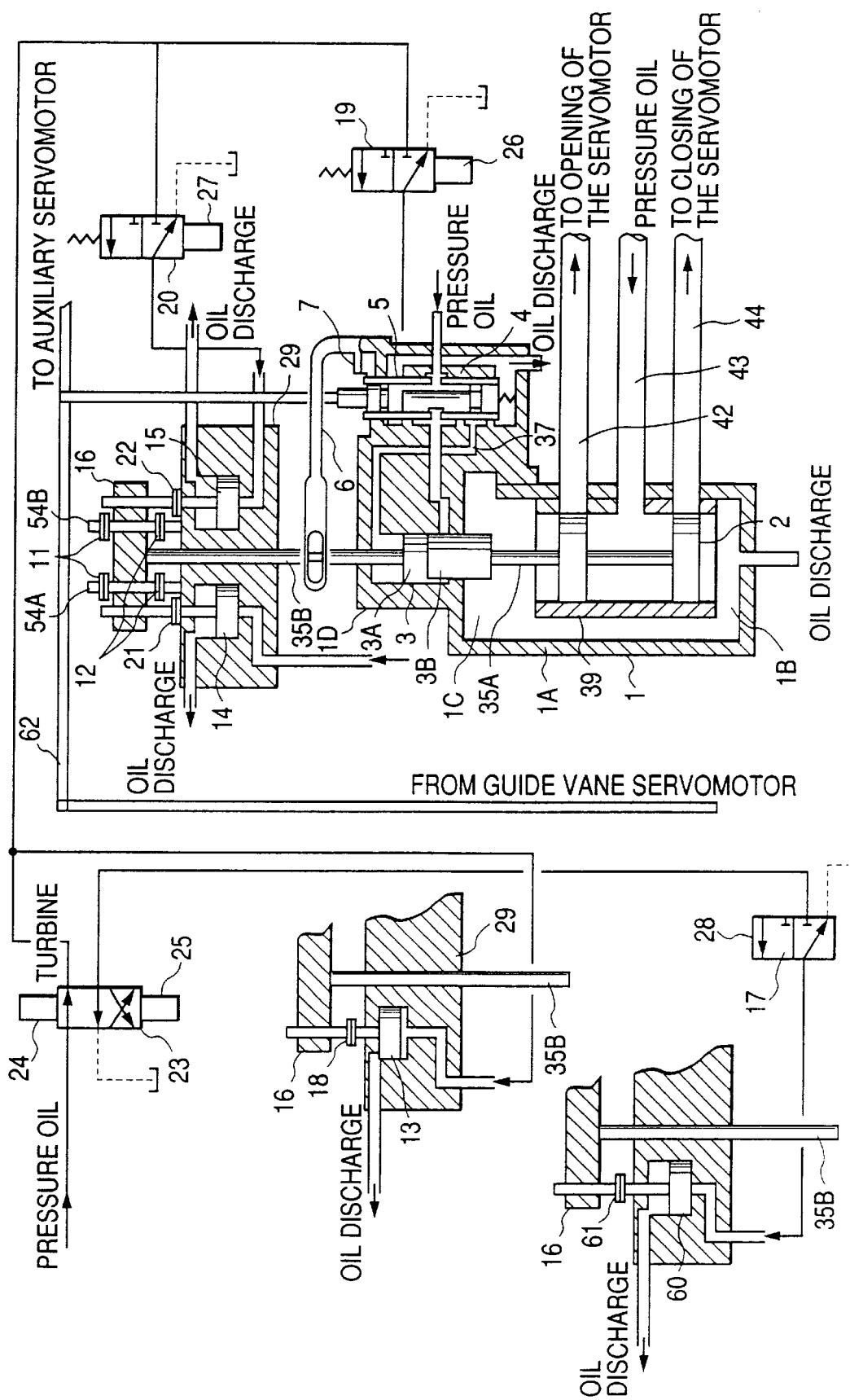
FIG. 3 is a diagram showing a mechanism of a secondary distributing valve and the vicinity thereof used in the embodiment.

A guide vane control unit illustrated in FIG. 3 mainly comprises an auxiliary servomotor (not shown) which produces a guide vane opening command signal in accordance with a command issued by a governor (not shown), a pilot valve which responds to a difference between the guide vane opening command signal provided from the auxiliary servomotor and a restoration signal provided from a guide vane servomotor and operates to eliminate the difference between the two, a secondary distributing valve 1 which operates the guide vane servomotor hydraulically, a valve servomotor 3 connected directly to a plunger 2 of the secondary distributing valve 1 and which is operated hydraulically by the pilot valve, and a guide vane closing speed selector 29 which restricts vertical displacement of the plunger 2 of the secondary distributing valve 1 mechanically and thereby provides a desired limitation on the guide vane closing speed according to operating conditions of the pump-turbine concerned.

The secondary distributing valve 1 includes a casing 1A having cylindrical spaces 1B, 1C, a bushing 39 fixed to the wall surface of the casing 1A coaxially with the valve servomotor 3, the plunger 2 connected to the valve servomotor 3, sliding inside of bushing 39 concerned in contact up and down and which makes a hydraulic control for an opening/closing chamber of the guide vane servomotor, a shaft 35A which connects the plunger 2 and the valve servomotor 3 directly with each other, a pressure oil port 43, an opening port 42 and a closing port 44.

The valve servomotor 3 includes a differential piston having a large-diameter portion 3A and a small-diameter portion 3B and a valve servomotor cylinder 1D which is combined and integral with a casing 1A of the secondary distributing valve.

The pilot valve includes a pilot plunger 4, a restoring lever 6, a bushing 5 whose upper end is pushed at all times against a branch portion 7 of the lever 6 by virtue of a spring disposed at the lower end of the bushing, a pressure oil supply port, and a hydraulic valve servocontrol line 37.

As an example, when the opening of the auxiliary servomotor (not shown) increases, the rightmost end of a lever 62 moves upward, so that the pilot plunger 4 of the pilot valve moves upward. The hydraulic valve servocontrol line 37 is connected to the oil discharge side and the pressure drops, allowing the valve servomotor 3 to move upward, so that the restoring lever 6 turns rightward and the branch portion 7 of the lever 6 moves upward. Consequently, the bushing 5 moves upward and a relative displacement with respect to the pilot plunger 4 approaches zero gradually. As a result of this restoration, the pressure in the hydraulic valve servocontrol line 37 again reverts to a value matching the hydraulic force acting on a lower chamber of the valve servomotor 3. On the other hand, the plunger 2 moves upward with the upward movement of the valve servomotor 3 and a pressure oil 43 is fed to an opening line 42 of the guide vane servomotor (not shown), while a closing line 44 of the guide vane servomotor is connected to the oil discharge side. As a result, the guide vane servomotor performs an opening operation. With this opening operation of the guide vane servomotor, the leftmost end of the restoring lever 6 moves downward and the pilot plunger 4 also moves downward, creating a relative displacement opposite to the previous one with respect to the bushing 5. As a result, pressure oil is fed to the hydraulic valve servocontrol line 37, the valve servomotor 3 moves downward, and the plunger 2 returns to its original neutral position. In this same way as above this downward movement of the plunger 2 is transmitted to the restoring lever 6 and the branch portion 7 thereof. Thus the bushing 5 moves downward and the relative displacement thereof with respect to the pilot plunger 4 approaches zero gradually. As a result of this restoration, the oil pressure in the hydraulic valve servocontrol line 37 which has once increased again returns to a value matching the hydraulic pressure acting on the lower chamber of the valve servomotor 3 and eventually the line 37 returns to its original position together with the pilot plunger 4 and plunger 2 and becomes stable. The above description is of an opening motion of the auxiliary servomotor (a guide vane opening command) involving a temporary upward movement of the plunger 2, but it goes without saying that the plunger 2 moves downward temporarily in the case of a closing motion of the auxiliary motor (a guide vane closing command). A large amount of the temporary upward movement of the plunger 2 means a rapid and transient opening of the guide vane servomotor, while a large amount of the temporary downward movement of the plunger 2 means a rapid and transient closing of the guide vane servomotor. It follows that the guide vane closing rate can be limited by limiting the amount of downward movement of the plunger 2 mechanically. Of course, there also is another method for limiting the guide vane closing rate. For example, a desired restriction may be inserted into each of the pressure oil line 43 in the secondary distributing valve, the oil discharge line, the opening line 42 in the guide vane servomotor, and the closing line 44 in the same servomotor. The following description will be directed to only the proposal of mechanically restricting the amount of downward movement of the plunger 2, provided the invention is not limited thereto insofar as the limitation on the guide vane closing rate according to the invention is attained eventually.

Guide vane closing speed selectors employable as the guide vane closing speed selector 29 can be broadly classified into a fixed type opening/closing speed limiter, a rapid closing rate selector, a guide vane opening responsive slow closing rate selector, a rotational speed responsive slow closing rate selector, and a pump mode slow closing rate selector.

The fixed type opening/closing speed limiter includes a shaft 35B connected mechanically to the plunger 2 of the secondary distributing valve, a stopper plate 16 attached to the upper end of the shaft 35B, a pair of bolts 54A and 54B implanted in the valve servomotor cylinder 1D, opening speed limiting nuts 11 mounted on the bolts 54A and 54B to limit an upward displacement of the stopper plate 16, and closing speed limiting nuts 12 also mounted on the bolts 54A and 54B to limit a downward displacement of the stopper plate.

The rapid closing rate selector includes an operation mode switching solenoid valve 23, a solenoid 24 included in the solenoid valve 23 and energized in generating operation (a turbine operation mode in the case of a pump-turbine), a solenoid 25 also included in the solenoid valve 23 and energized in pumping operation, a stop piston 13 which is moved upward by a pressure oil fed from the solenoid valve 23, and a nut 18 mounted adjustably on the stop piston 13 to restrict a downward displacement of the stopper plate 16.

The guide vane opening responsive slow closing rate selector includes a solenoid valve 19, a solenoid 26 included in the solenoid valve 19 and de-energized at a guide vane opening of $Y<Ya$ (energized at a guide vane opening of $Y>Ya$), a stop piston 14 which is moved upward by a pressure oil fed from the solenoid valve 19 upon de-energization of the solenoid 26, and a nut 21 mounted adjustably on the stop piston 14 to restrict a downward displacement of the stopper plate 16.

The rotational speed responsive closing rate selector includes a solenoid valve 20, a solenoid 27 which is de-energized when the rotational speed of the pump-turbine concerned meets the relation of $N>Na$ or when the rotational speed of any of the other pump-turbines sharing conduits is larger than a predetermined value (say $N>Nb$) and which is energized when the rotational speed of the pump-turbine concerned is $N<Na$ and the rotational speeds of all the other pump-turbines are smaller than the predetermined value (say $N<Nb$), a stop piston 15 which is moved upward by a pressure oil fed from the solenoid valve 20 upon de-energization of the solenoid 27, and a nut 22 mounted adjustably on the stop piston 15 to restrict a downward displacement of the stopper plate 16.

The pump mode slow closing rate selector includes a solenoid valve 17, a solenoid 28 included in the solenoid valve 17 and energized at a guide vane opening of $Y<Ya'$ in pumping operation, a stop piston 60 which is moved upward by a pressure oil fed through the solenoid valves 23 and 17 upon energization of the solenoid 28, and a nut 61 mounted adjustably on the stop piston 60 to restrict a downward displacement of the stopper plate 16.

Figure 4:
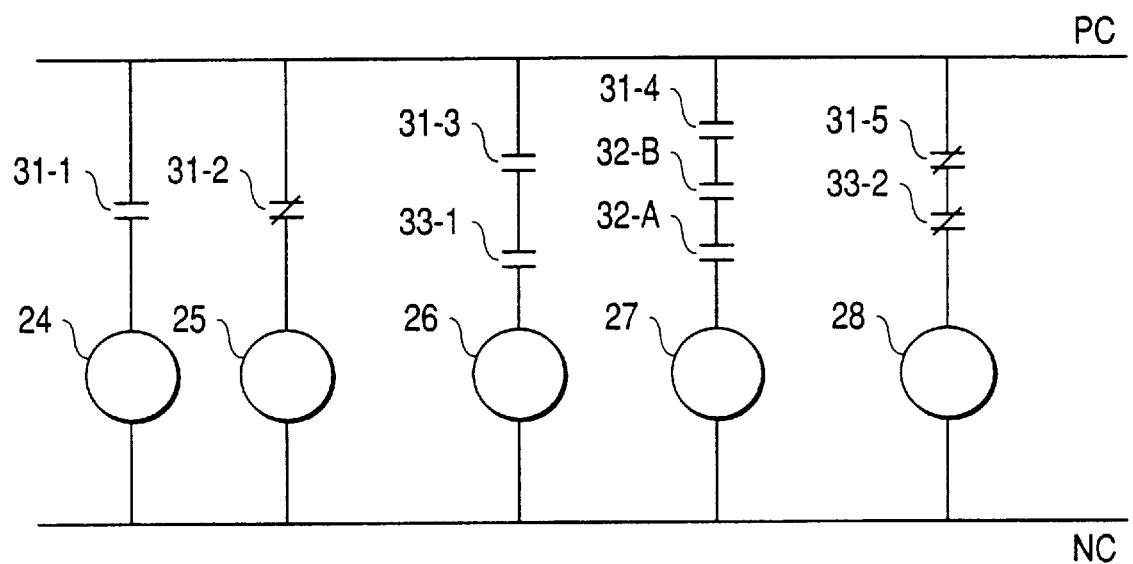
FIG. 4 is a circuit diagram of various solenoids used in the embodiment.

FIG. 4 is a control circuit diagram for the solenoids 24 to 28, in which the reference mark PC stands for a plus side of a DC power supply and NC stands for a minus side of the DC power supply. Numeral 31-1 denotes a contact of a pumping/generating (turbine) mode selection switch in the plant concerned (the pump-turbine concerned if attention is paid to only pump-turbines), which contact closes in the generating mode. The solenoid 24 is energized as soon as the generating side is selected in the pump-turbine concerned. As a result, the stop piston 13 is moved upward by the pressure oil fed from the operation mode switching solenoid valve 23, and a rapid guide vane closing rate in the generating mode is set by the nut 18. On the other hand, the numeral 31-2 denotes another contact of the pumping/generating (turbine) mode selection switch in the plant concerned (the pump-turbine concerned), which contact closes in the pumping mode. As soon as the pumping side is selected in the pump-turbine concerned, the solenoid 25 is energized. The above description is based on the assumption that the rapid guide vane closing rate in the generating mode is smaller than that in the pumping mode. But in the reverse case it is necessary that the stop piston 13 be moved upward in the pumping mode.

Numeral 31-3 denotes a further contact of the pumping/generating (turbine) mode selection switch, which contact closes in the generating mode. Numeral 33-1 denotes a contact of a guide vane opening detection switch, which contact opens when the guide vane opening (Y) of the pump-turbine concerned is smaller than the predetermined value (Ya). When Y is larger than Ya in the generating mode, the solenoid 26 is energized, but when Y is smaller than Ya, the solenoid 26 is de-energized. Also, upon turning OFF of the power supply (PC-NC), the solenoid is de-energized. Once the solenoid is de-energized, the stop piston 14 is moved upward by the oil pressure fed from the operation mode switching solenoid valve 23 and the downward displacement of the stop plate 16 is restricted by the nut 21, allowing the guide vane opening responsive slow closing rate selector to operate. Also in the case where the pumping/generating (turbine) mode selection switch is turned to the pumping side, the solenoid 26 is de-energized. At this time, however, since the solenoid 25 is energized (the solenoid 24 is de-energized) and the pressure oil supply line to the solenoid valve 19 is connected to the oil discharge side through the operation mode switching solenoid valve 23, the stop piston 14 can no longer move upward and hence the guide vane opening responsive slow closing rate selector does not operate. Thus, in the generating mode, the guide vane opening responsive slow closing rate selector is set to a fail operation upon turning OFF of the power supply.

Numeral 31-4 denotes a further contact of the pumping/generating (turbine) mode selection switch, which contact closes in the generating mode. Numeral 32-A denotes a contact of the rotational speed increase detector in the pump-turbine concerned, which contact closes at N<Na and opens at N>Na. Numeral 32-B denotes a contact of the rotational speed increase detector in another pump-turbine sharing conduits, which contact closes at N<Nb and opens at N>Nb. Although this description is directed to the case where the number of pump-turbine other than the pump-turbine concerned is one, if there are plural other pump-turbines, it is necessary that the contacts of rotational speed increase detectors in the pump-turbines be all connected in series like 32-B1, 32-B2, . . . on the circuit of the solenoid 27. By so doing, even when the rotational speed of the pump-turbine concerned is N>Na, or even when the rotational speed of any other pump-turbine sharing conduits is N>Nbi, or even upon turning OFF of the power supply (PC-NC), the solenoid 27 is de-energized. Once the solenoid 27 is de-energized, as mentioned above, the stop piston 15 moves upward by virtue of the pressure oil fed from the operation mode switching solenoid valve 23 and the downward displacement of the stop plate 16 is restricted by the nut 22, then the rotational speed responsive slow closing rate selector operates. Also when the pumping/generating (turbine) mode selecting switch is turned to the pumping side, the solenoid 27 is de-energized. In this case, however, the solenoid 25 is energized (the solenoid 24 is de-energized) and the pressure oil supply line to the solenoid valve 20 is connected to the oil discharge side through the operation mode switching solenoid valve 23, so that the stop piston 15 can no longer move upward and hence the rotational speed responsive slow closing rate selector does not operate. Also in this case, the selector in question is set to a fail operation upon turning OFF of the power supply like the guide vane opening responsive slow closing rate selector, as mentioned previously.

Numeral 31-5 denotes a further contact of the pumping/generating (turbine) mode selecting switch, which contact closes in the pumping mode. Numeral 33-2 denotes a contact of the guide vane opening detection switch, which contact closes when the guide vane opening (Y) in the pump-turbine concerned is smaller than the predetermined value (Ya'). Thus, the solenoid 28 is energized when both conditions of pumping mode and Y<Ya' exist. In the pumping mode, pressure oil is fed to the solenoid valve 17 from the operation mode switching solenoid valve 23, so that upon energization of the solenoid 28 the pressure oil is conducted to the stop piston 60 and pushes up the piston. Consequently, the downward displacement of the stopper plate 16 is restricted by the nut 61 mounted adjustably on the stop piston 60. That is, the pump mode slow closing rate is selected. When the power supply is turned OFF and the solenoid 28 de-energized, the lower chamber of the stop piston 60 is connected to the oil discharge side, so that the pump mode slow closing selector fails to work. In the pumping mode, unlike the generating mode, this is safer when the power supply turns OFF. The reason for this failure to work is that it is intended to prevent a reverse rotation of the pump, as disclosed in Japanese Patent Publication No. 38559/85.

Reference will now be made to the relation between the limitation placed on the lower movement of the stopper plate 16 and the limitation on the guide vane closing speed. As a matter of course, the smaller the downward movement of the stopper plate 16, the smaller the displacement in the closing direction of the plunger 2 in the secondary distributing valve, so that the guide vane closing speed is limited to a slower speed. To be more specific, for example, a downward displacement tolerance of the fixed type opening/closing speed limiter using the closing speed limiting nuts 12, that is, the rapid closing rate limit in the pumping mode > a downward displacement tolerance of the rapid closing rate selector using the nut 18 in a pushed-up state of the stop piston 13, that is, the rapid closing rate limit in the generating mode > a downward displacement tolerance of the guide vane opening responsive slow closing rate selector using the nut 21 in a pushed-up state of the stop piston 14, that is, the slow closing rate limit after goosenecking in the generating mode according to the prior art ≈ a downward displacement tolerance of the rotational speed responsive slow closing rate selector using the nut 22 in a pushed-up state of the stop piston 15, that is, the backup goosenecking rate/slow closing rate limit in the generating mode according to the present invention ≈ the slow closing rate limit after goosenecking in the pump mode slow closing rate selector using the nut 61.

An essential condition in the present invention resides in only the following portion: a downward displacement tolerance of the rapid closing rate selector using the nut 18 in a pushed-up state of the stop piston 13, that is, [rapid closing rate limit in the generating mode > a downward displacement tolerance of the guide vane opening responsive slow closing rate selector using the nut 21 in a pushed-up state of the stop piston 14, that is, the slow closing rate limit after goosenecking in the generating mode according to the prior art ≈ a downward displacement tolerance of the rotational speed responsive slow closing rate selector using the nut 22 in a pushed-up state of the stop piston 15, that is, the backup goosenecking rate/slow closing rate in the generating mode according to the present invention]. In other words, [rapid closing rate limit in the pumping mode < rapid closing rate limit in the generating mode] will do. It is not always necessary that the slow closing rate limit after goosenecking in the pumping mode be set at a value equal to the slow closing rate limit after goosenecking or the backup goosenecking rate limit in the generating mode.

Figure 7:
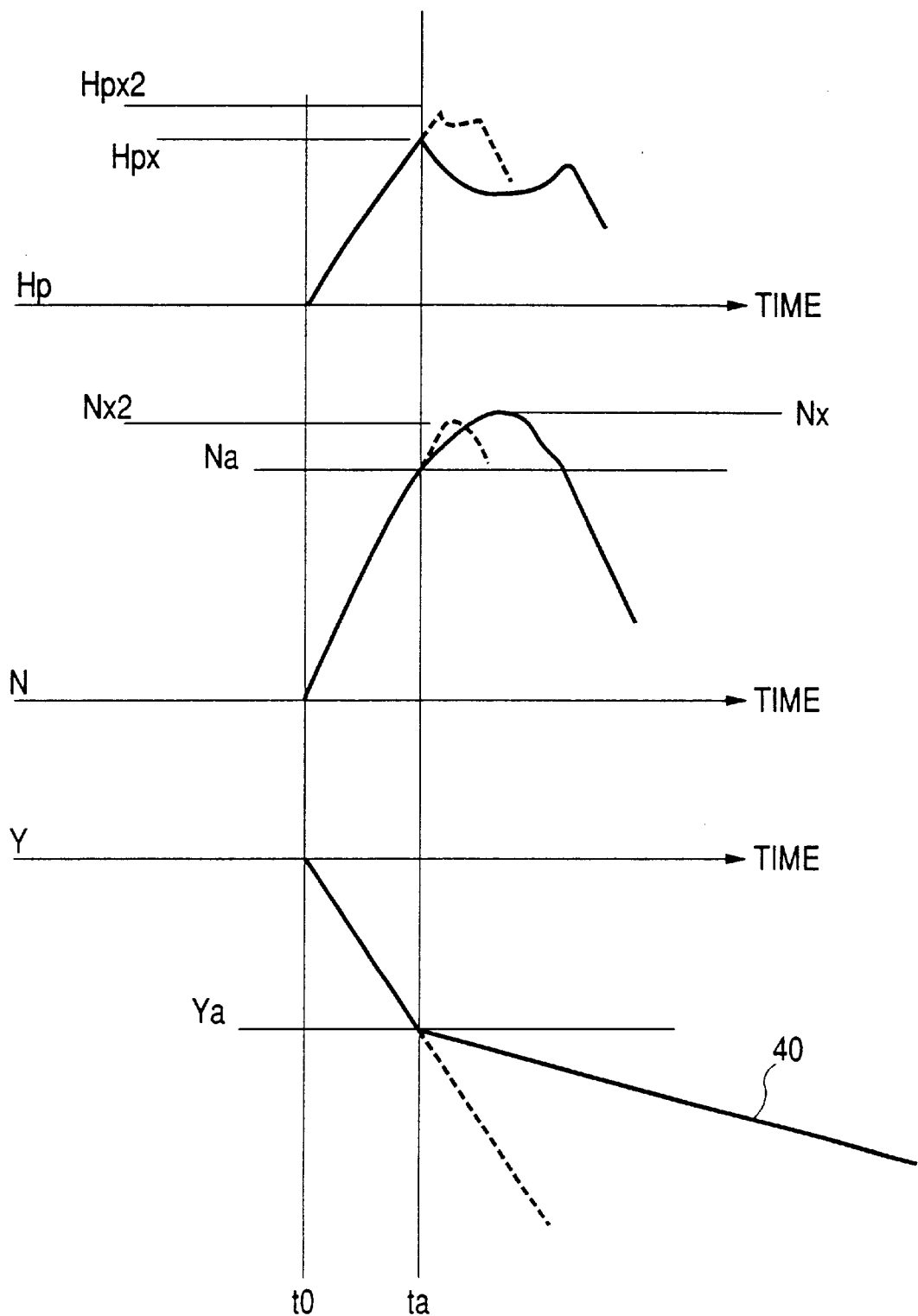
FIG. 7 is a diagram showing both another example of behavior in load rejection of a pump-turbine and a method of setting a rotational speed increase detector of the present invention according to the prior art.

FIG. 7 is a diagram explaining how to set the rotational speed increase detector for the rotational speed responsive slow closing rate selector in the present invention. Assuming that the full load of a certain pump-turbine out of plural pump-turbines sharing conduits is rejected at a time point of t0, the rotational speed N of that pump-turbine increases as illustrated in the same figure. Then, a governor (not shown) responds to this increase of N and the guide vane opening Y is closed rapidly as indicated by a solid line in the figure. In the example of FIG. 3, this closing rate is set by the nut 18. When Y becomes smaller than Ya, the guide vane opening detecting switch 33-1 operates in the example of FIGS. 3 and 4 and so does the guide vane opening responsive slow closing rate selector, with the result that the guide vane closing rate is limited from the previous rapid closing rate to the slow closing rate. To use a common word, the guide vane closing rate is goosenecked. On the other hand, the turbine discharge is throttled rapidly by rapid closing of the guide vanes, so that the water pressure Hp in the upper reservoir-side conduit in the pump-turbine concerned rises as in the figure. Once the guide vane closing rate is goosenecked, the flow rate decreasing rate also drops, so that the rise of Hp once stops and drops as indicated by a solid line in the figure. Thereafter, as the operation point of the pump-turbine concerned enters the S-characteristic and begins to follow the same characteristic in the flow decreasing direction, the water pressure Hp again begins to rise naturally by a positive feedback circuitwise amplifying action of the S-characteristic itself despite slow closing of the guide vanes. When the operation point enters the S-characteristic and follows it in the flow decreasing direction, there substantially exist the relations of dN/dt<0 and d2 N/dt2<0. If this goosenecking is not performed and the guide vanes continue to close rapidly like the dotted line, the graph of Hp becomes like the dotted line. That is, although the rotational speed N drops a little, but the water pressure Hp in the upper reservoir-side conduit rises to a large extent, while the water pressure in the lower reservoir-side conduit drops to a large extent. The latter is likely to cause a serious problem of water column separation→recombination and so a special care must be exercised. If the rotational speed responsive slow closing rate selector in the pump-turbine concerned is operated under the condition of N>Na, it is possible to avoid such a trouble as indicated by the dotted line in the figure. More specifically, in the example of FIGS. 3 and 4, the rotational speed responsive slow closing rate selector is operated by operation of the contact 32-A of the rotational speed increase detector in the pump-turbine concerned. The value of Na may be set equal to N at the time of substantial arrival of Y at Ya in full load rejection of this single machine. Alternatively, it may be set equal to N meeting the condition that d2 N/dt2 is almost zero at dN/dt<0 on the curve of N. If the value of N is set at a value somewhat larger than N at the time point of substantial arrival of Y at Ya in full load rejection of this single machine, the goosenecking point does not change nor does the guide vane closing pattern change as long as the guide vane opening responsive slow closing rate selector according to the prior art operates normally, whereby it is made possible to completely eliminate any actual disadvantage caused by the addition of the rotational speed responsive slow closing rate selector according to the present invention. In the present invention, moreover, even when the load of any of the plural pump-turbines sharing conduits is rejected and N is larger than a predetermined value (Nb corresponding to the foregoing Na of the machine concerned, which Nb may be set at a value equal to the Na if the pump-turbines are of the same specification), the rotational speed responsive slow closing rate selector in the machine concerned is operated.

Figure 5:
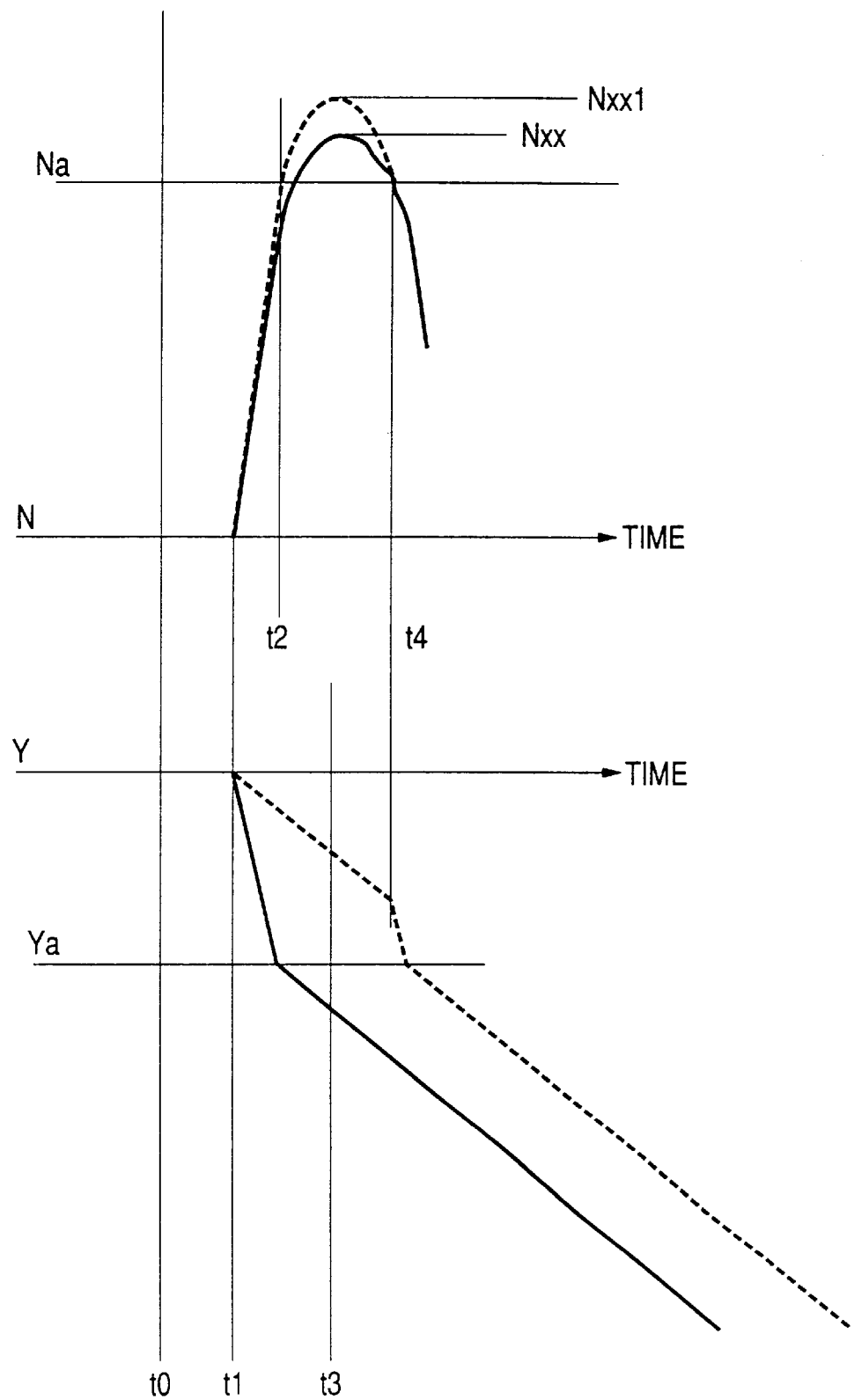
FIG. 5 is a diagram showing an example of behavior in load rejection of a pump-turbine according to the present invention.
Figure 6:
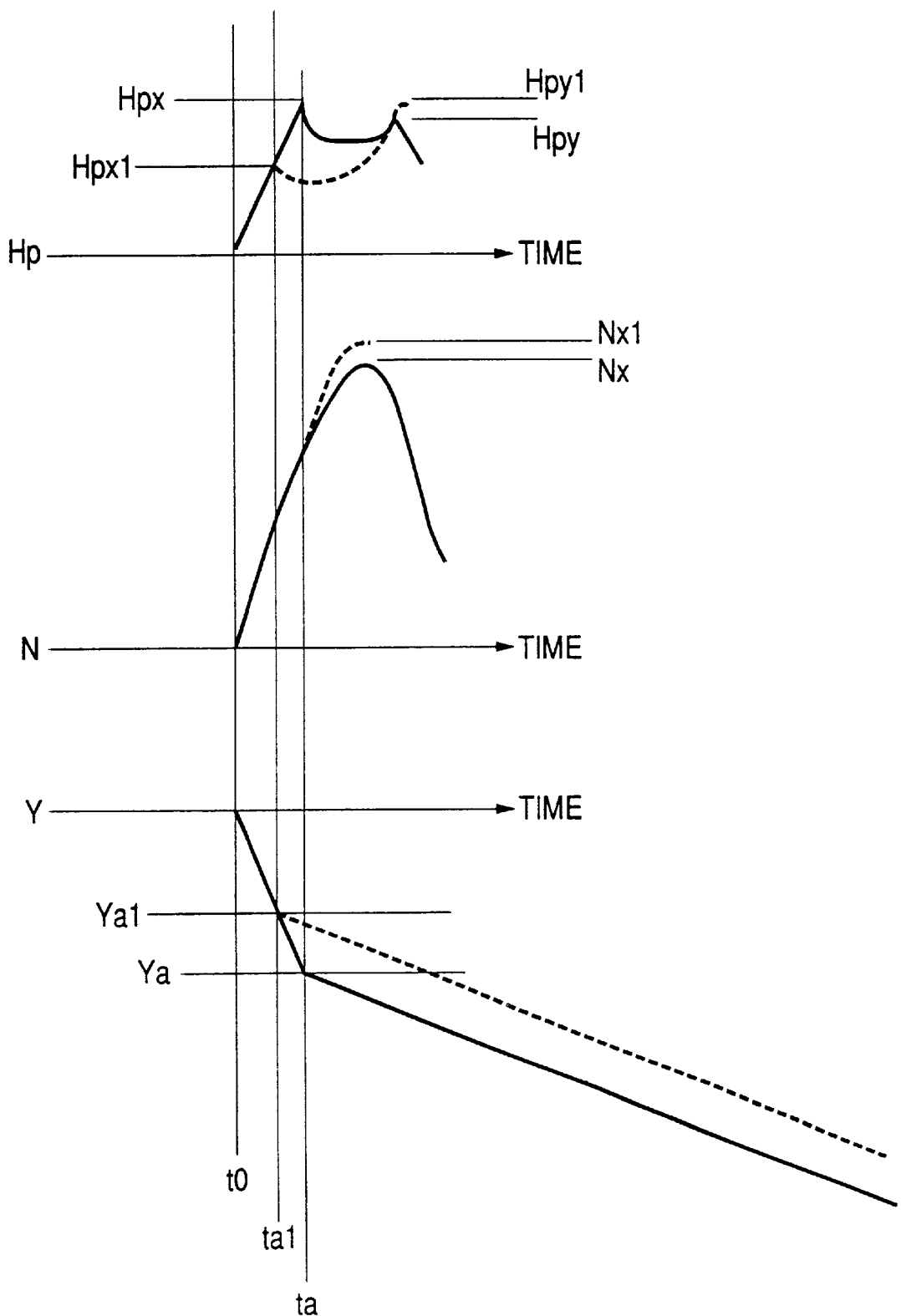
FIG. 6 is a diagram showing an example of behavior in load rejection of a pump-turbine according to the prior art.

FIG. 5 is a diagram showing the behavior of the machine concerned upon operation of the rotational speed responsive slow closing rate limiter between pump-turbines. FIG. 5 shows a state in which the load of the machine concerned was rejected at time t1 after load rejection at time t0 of another pump-turbine (not shown) sharing conduits. Though not specially shown, it is here assumed that the contact 32-B of the rotational speed increase detector in another pump-turbine operates prior to time t1 (N>Nb) and this state continues up to time t3. According to the prior art, the guide vanes of the machine concerned begin to close rapidly just after load rejection and are closed as indicated by the solid line, whereas according to the present invention the guide vanes are closed like the dotted line. That is, in the presence of a detrimental water hammer interference from another pump-turbine, the guide vane closing rate is limited to a predetermined slow closing rate. The rapid closing ought to start after the elimination of the detrimental water hammer interference from another pump-turbine, that is, after the time t3, but the slow closing rate continues because N is set larger than Na in the pump-turbine concerned up to the time t4. It goes without saying that if the guide vane opening Y becomes smaller than Ya, a limit is placed on the guide vane opening responsive slow closing rate in the pump-turbine concerned and the guide vane closing rate is goosenecked as in the figure. At N>Na in the machine concerned, a limit is placed also on the rotational speed responsive closing rate in the machine concerned, as noted previously. By the limit on the rotational speed responsive slow closing rate between pump-turbines according to the present invention, N rises from Nxx to Nxx1 like the dotted line in the figure, but in the case of pump-turbines this difference is as small as several percent, scarcely causing any actual disadvantage, because the S-characteristic exerts an influence thereon.

Although in the above embodiment the rotational speed N of another machine is monitored as a condition for operating the guide vane slow closing rate limiter between pump-turbines, even if not only N itself but also dN/dt or d2N/dt2 obtained by adding a predetermined calculation thereto, or an index obtained by combining N with a quantity indicative of another operational state, is used, it is possible to make detection equal to N>Nb. In short, the present invention is based on the finding that in the curve of N is included information capable of substantially judging the time point just before entering the S-characteristic of the operation point in the pump-turbine concerned, at least information capable of judging an operational state which will cause a detrimental water hammer interference. These modifications are also dealt with by the present invention. The second reason for monitoring the behavior of another pump-turbine with use of N is because of an extremely smooth motion and easy measurement in comparison with other state quantities (e.g. H, Q) due to the influence of an inertial effect of the rotating portion in each pump-turbine and generator-motor.

Figure 8:
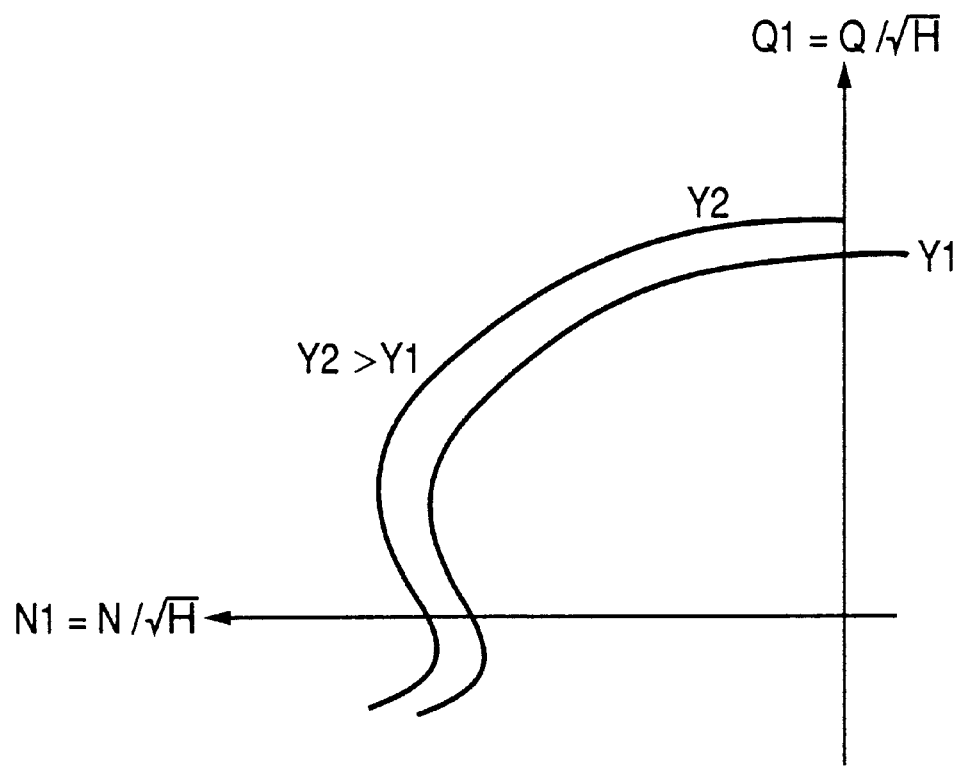
FIG. 8 is a diagram showing the S-characteristic of a pump-turbine.

Although in the above description the condition of N>Nb in another pump-turbine is monitored as a condition for operating the guide vane slow closing rate limiter between pump-turbines, another example of a monitoring method will now be described with reference to FIG. 8 which is a complete Q1-N1 characteristic diagram in the generating operation. In the same figure, $N1=N/\sqrt{H}$ and $Q1=Q/\sqrt{H}$ are plotted along the axis of abscissa and the axis of ordinate, respectively, where N stands for a rotational speed, H an effective head and Q a flow rate. Parameters Y2 and Y1 each represent a guide vane opening and are in the relation of Y2>Y1. A detrimental water hammer interference from another pump-turbine occurs when the operation point approaches the S-characteristic, giving rise to a gradient of dQ1/dN1, or when the operation point has entered the S-characteristic and is following it in the flow decreasing direction. The latter detecting method is proposed in Japanese Patent Publication No. 21033/88. As to the former, it is suggested to adopt a detecting method using the condition of (N1 is larger than a predetermined N1 value determined for each guide vane) or (the absolute value of dQ1/dN1 is larger than a predetermined value determined for each guide vane).

Although in the above embodiment all of plural pump-turbines sharing conduits are each provided with a rotational speed increase detector, only a specific pump-turbine or pump-turbines may be provided with such a detector if the number of pump-turbines is small (say two or three) and if the foregoing detrimental water hammer interference can be allowed.

Taking into account that the present invention aims at attaining two important functions, one of which is to back up the limitation on the guide vane opening responsive slow closing rate in the pump-turbine concerned and the other of which is to avoid a detrimental water hammer interference from another pump-turbine, it is unavoidable that the pump-turbines for which the former effect can be expected are limited in the above case where only a specific pump-turbine or -turbines are provided with a rotational speed increase detector.

It is preferable that the rotational speed increase detectors such as 32-A and 32-B in FIG. 4 be made completely independent of the governor which controls the auxiliary servomotor in FIG. 3 and be improved their reliability.

A more detailed description will be given below with reference to examples of dynamic characteristic analysis shown in FIGS. 9 to 11.

Figure 9:
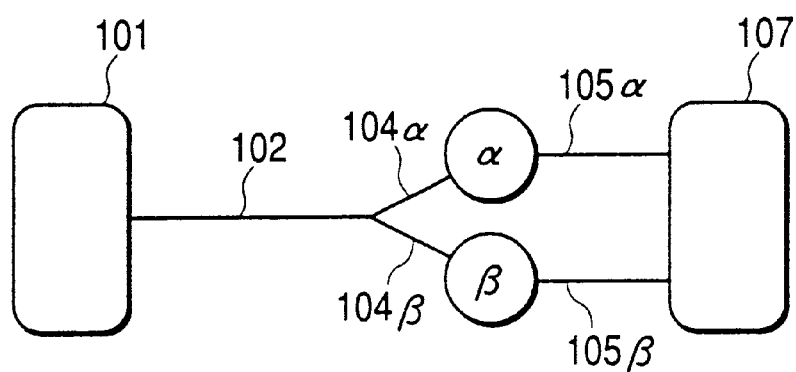
FIG. 9 is a construction diagram of conduits in a plant to be analyzed.

FIG. 9 is a construction diagram of conduits in a plant to be analyzed. In the same figure, the numeral 101 denotes an upper reservoir, numeral 102 denotes an upper reservoir-side conduit portion common to two pump-turbines, numerals 104 α and 104 β denote branch portions of the upper reservoir-side conduit for the pump-turbines, respectively, numerals 105 α and 105 β denote lower reservoir-side conduits for the pump-turbines, respectively, numeral 107 denotes a lower reservoir, and the marks α and β represent variable speed pump-turbines of the same specification. Each of both pump-turbines possesses the S-characteristic in the region of its generating operation.

Figure 12:
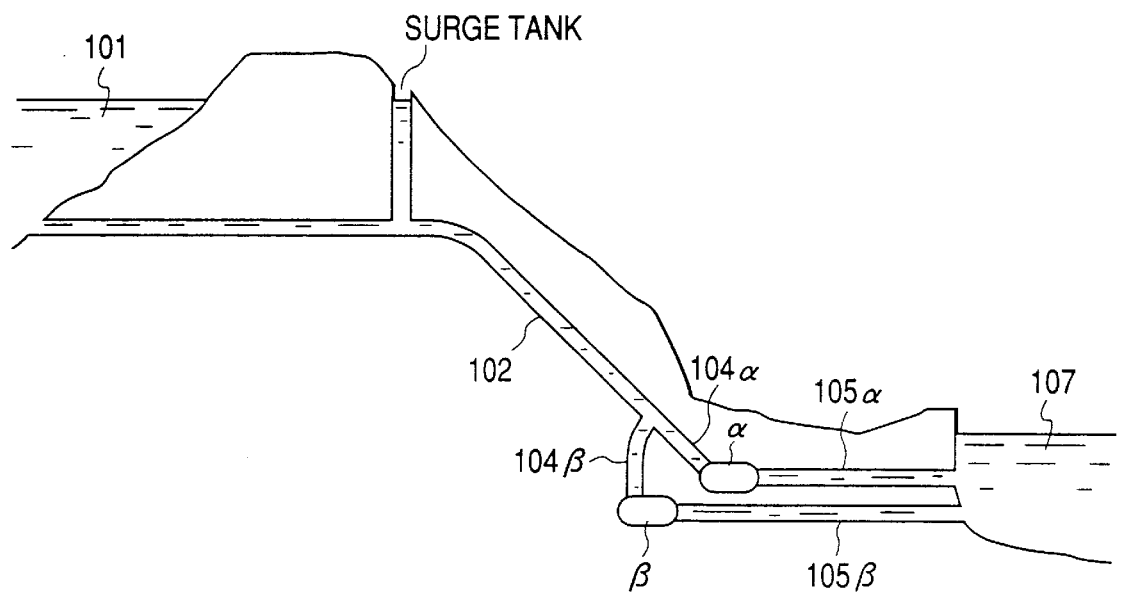
FIG. 12 is an illustrative view for showing another example of the conduit configuration of the plant to be analyzed shown in FIG. 9.

In addition, FIG. 12 is another figure for showing a constitution of the conduit for the plant to be analyzed.

The water flowed down form the upper reservoir 101 is supplied to the two variable speed pump-turbines α and β through the common portion 102 for the two of the upper reservoir side conduits that includes a surge tank.

Then, the common potion 102 for the two of the upper reservoir side conduits is provided with a long slant conduit portion, branched at a location just before the variable speed pump-turbine and then a certain amount of water is supplied to each of the variable speed pump-turbines. Each of the lower reservoir conduits 105 α and 105 β is connected to the lower reservoir 107, respectively.

Figure 10A:
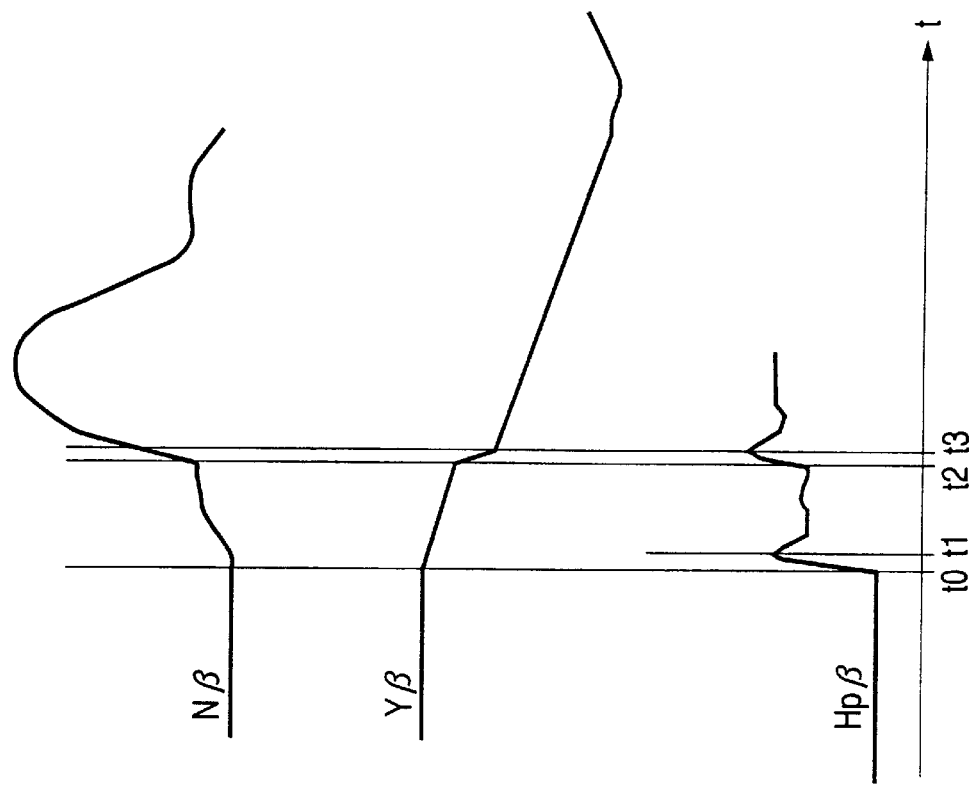
FIGS. 10(a) and 10(b) are diagrams showing the results of a dynamic characteristic analysis obtained by applying the prior art to the plant illustrated in FIG. 9.

FIGS. 10(a) and (b) and 11(a) and (b) show the result of behavior analysis made for each of the two variable speed pump-turbines under the condition that the loads of the pump-turbines are rejected successively with a difference of 10 seconds during the generating operation.

Figure 10B:
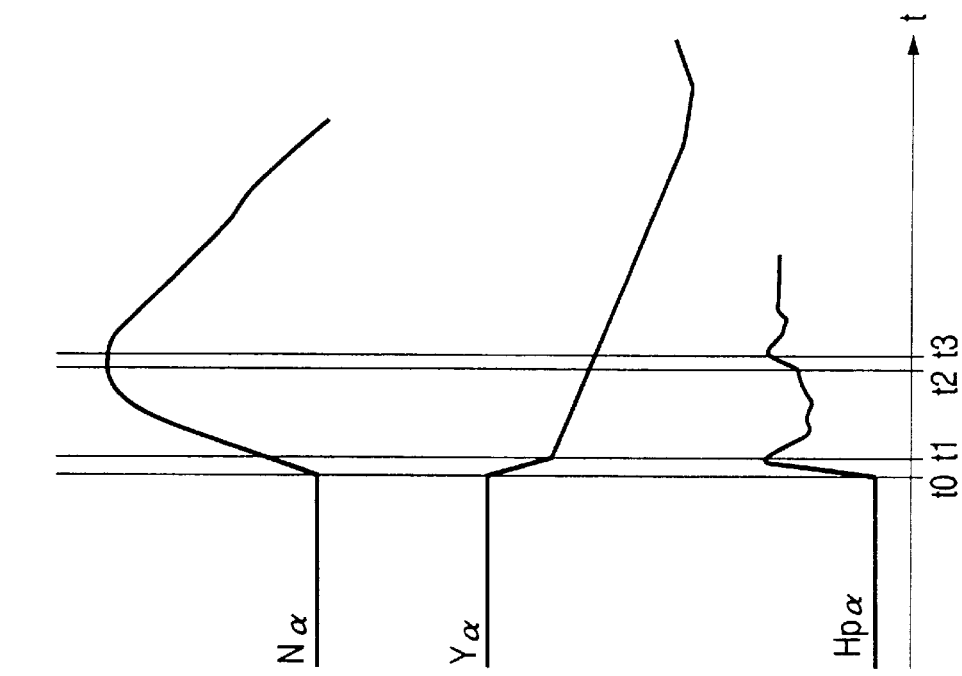
Figure 11A:
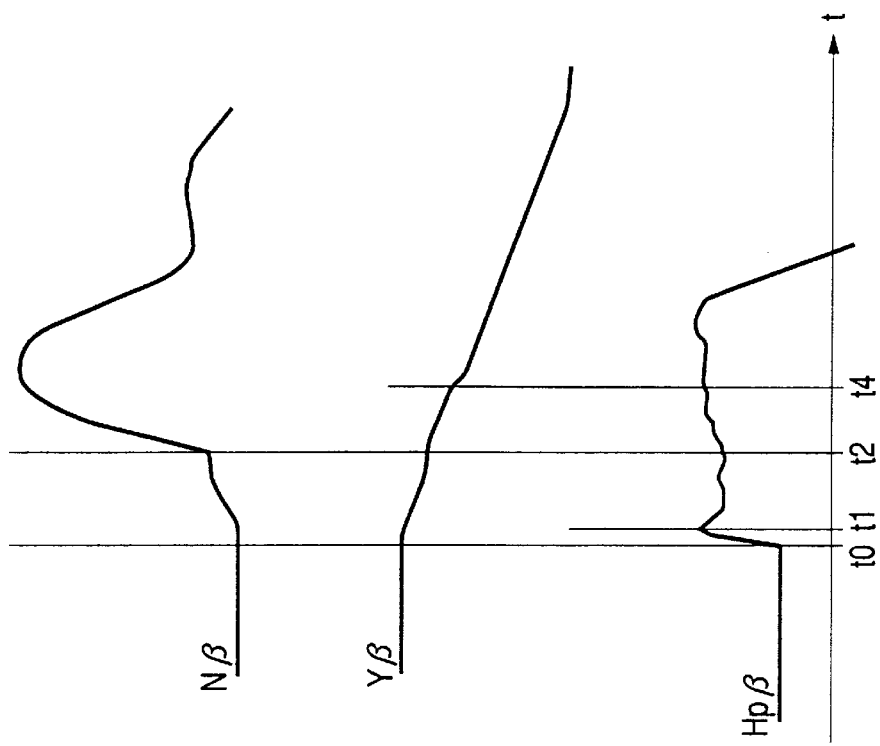
FIGS. 11(a) and 11(b) are diagrams showing the results of a dynamic characteristic analysis obtained by applying the technique of the present invention to the plant illustrated in FIG. 9.
Figure 11B:
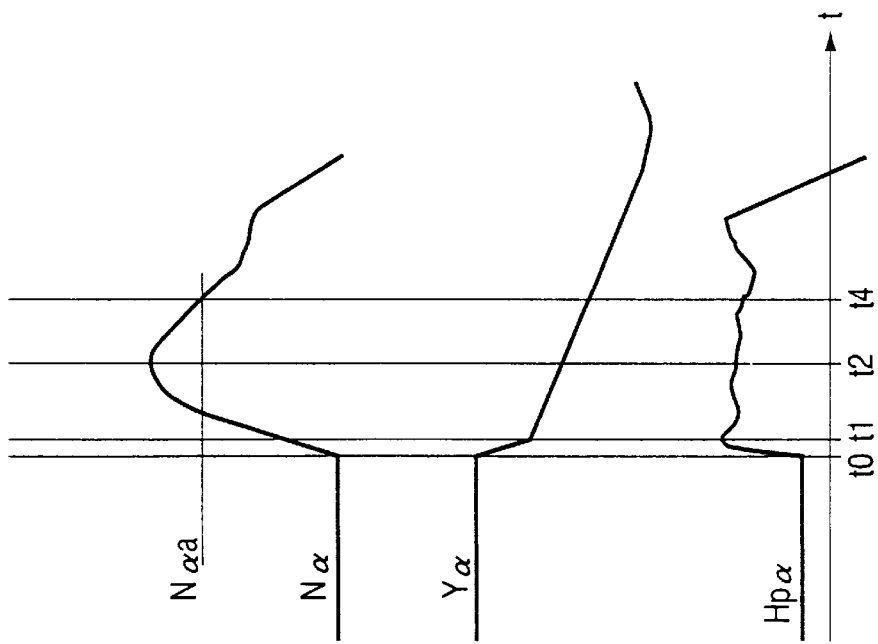

FIGS. 10(a) and 10(b) are of the case following the prior art and FIGS. 11(a) and (b) are of the case following the present invention, wherein as the configuration for the variable speed pump-turbine, it is possible to apply the constitutions disclosed in Japanese Patent Laid-Open No. 90991/85 and 71497/87.

Reference will be made first to FIGS. 10(a) and (b). It is the pump-turbine α that is the first to be rejected its load. The rotational speed N α increases upon load rejection. The governor (not shown) responds thereto and a guide vane Y α is closed rapidly as in the figure. If the opening of the guide vane Y α is smaller than a predetermined opening Y α a, the guide vane closing speed is gooseneck and slows down as in the figure. As a result, the water pressure Hp α at an end of the pump-turbine α in the upper reservoir-side conduit increases as in the figure. Of course, a rapid increase from time t0 to time t1 is due to rapid closing of the guide vane Y α in the pump-turbine concerned. The second peak results from a synergistic influence between the influence of the operation point of the pump-turbine concerned following the S-characteristic in the flow decreasing direction and the influence of rapid closing of the guide vane in the other pump-turbine (β) which will be described later. That the operation point is following the S-characteristic in the flow decreasing direction can be confirmed by reference to the curve of N α. This timing corresponds to the turning point to descent of N α, represented by $dN/dt<0$ and $d^2 N/dt^2<0$. The variation of the water pressure Hp α is transmitted also to the pump-turbine β through the conduits 104 α and 104 β, so that the water pressure Hp β at an end of the pump-turbine β in the upper reservoir-side conduit also varies as in the figures. Since the first peak of Hp β is due to a water hammer interference from the pump-turbine α, it is somewhat lower than the first peak of Hp α. Though not shown, both machines α and β are variable speed machines, in which the governor control for the rotational speed relatively slow in response is alive at all times. An increase of Hp β caused by water hammer interference from the other machine results in a temporary increase in the turbine output of the machine β (at this time the generator load is controlled constant), so that the rotational speed of the machine β also increases to some extent and the governor responds thereto, whereby the guide vanes in the machine β are closed slowly. At time t2, the load of the machine β is also rejected, whereupon the rotational speed of the machine β begins to increase rapidly, to which the governor responds, and the guide vanes in the machine β are closed rapidly. At this time, the operation point of the machine α is following the S-characteristic in the flow decreasing direction, as mentioned above, so that this flow throttling effect and the flow throttling effect attained by the guide vanes of the machine β overlap each other and the second peak of Hp β rises to an abnormal extent. A description will now be given from a different viewpoint. In FIG. 9, throttling effect based on the S-characteristic at the lower reservoir end of the conduit 104 α and the throttling effect based on the rapid closing of the guide vanes at the lower reservoir end of the conduit 104 β act at the same time. Therefore, it is rather a matter of course that the deceleration in the common portion of the upper reservoir-side conduit increases and gives rise to an abnormal water hammer. In this case, since the throttling effect based on the rapid closing of the guide vanes at the lower reservoir end of the conduit 104 β is stronger than the S-characteristic throttling effect at the lower reservoir end of the conduit 104 α, the second peak of Hp β is higher than the second peak of Hp α.

At time t4 the guide vane closing speed is gooseneked. After this time point, the gooseneck in both machines is effective in limiting the guide vane closing speed, so that even if the machine α continues the S-throttling or even when the machine β begins S-throttling, the foregoing undesirable synergistic effect does not occur and hence there is no fear of both Hp α and Hp β assuming an abnormal state.

FIGS. 11(a) and (b) shows the results of analysis made by adopting the present invention. When the rotational speed N α of the machine α becomes larger than N α a, the guide vane closing speed in the machine β is gooseneked. Therefore, even if the load of the machine β is rejected at time t2, the guide vanes of the machine β are not closed rapidly. When the gooseneck between the pump-turbines is removed at time t3, the guide vanes begin to close rapidly. In this case, however, the guide vane opening responsive gooseneck is applied soon in the pump-turbine concerned and thus the gooseneked state is again assumed. As a result, such an abnormal rise of the second peak of Hp β as shown in FIG. 10(b) does not occur at all and the highest water pressure of Hp β is determined by the first peak. From the fact that in FIG. 10(b) the second peak of Hp β is the highest water pressure thereof it is seen that the above measure exhibits an outstanding effect in reducing the design water pressure in the pump-turbines and in the upstream conduit. As is seen from a comparison between FIGS. 10 and 11, are option of the present invention results in a little increase in the rising degree of the rotational speed N β, but in the case of pump-turbines such a rise is suppressed to a slight degree by the S-characteristic, posing no problem.

Although the preferred embodiment shown in FIGS. 11(a) and (b) are an example of be abnormal interference of water hammer at the upper reservoir conduit, in the case that the lower reservoir conduit is branched to cause the lower reservoir conduits 105 α and 105 β to be commonly applied subsequent to branch point, it goes without saying that the above measure serves as a measure against abnormal water hammer interference in the lower reservoir side conduit.

In addition, in the aforesaid preferred embodiment, this has been described in reference to both pump-turbines α and β having S-characteristics in the generation region, although even if both pump-turbines α and β have no S-characteristics in the generation region and one of both pump-turbines α and β have no S-characteristics, the present invention can be applied.

The effects of the present invention are apparent from the above description. That is, a detrimental water hammer interference related to the S-characteristic and occurring between plural pump-turbines sharing conduits can be eliminated or greatly diminished. Backup of the limitation on the guide vane opening responsive slowing closing rate in the pump-turbine concerned can also be attained. In the field, since the problem of a detrimental water hammer interference from another pump-turbine sharing conduits is solved, it is no longer necessary to conduct a test wherein the loads of plural pump-turbines are rejected successively with a time difference (control by only the simultaneous load rejection will do and hence a guide vane closing pattern can be determined at the time of full load rejection in a single machine). Since the problem of a detrimental water hammer interference from another machine sharing conduits is solved, the case where the maximum water hammer is generated can be limited to the time when all the machines, or pump-turbines, have rejected their full load. Consequently, it becomes possible to establish a more rational guide vane closing pattern for reducing the range of water pressure increase in the upper reservoir-side conduit or the range of water pressure decrease in the lower reservoir-side conduit. To be more specific, it becomes sufficient to make efforts for diminishing the maximum variation range, including the case of making the second peak high like the dotted line in FIG. 6. As a result, the possibility has been developed that the water hammer variation range in the simultaneous full load rejection in all the pump-turbines might be diminished to a considerable extent. This means that the design pressure not only in the upper reservoir-side conduit but also in the pump-turbine concerned, itself can be reduced and that the difference (static suction head) of the pump-turbine installed position relative to the water level in the lower reservoir can be reduced, that is, the excavation quantity in the civil engineering work can be reduced. Despite such outstanding effects, it is substantially only the cost of addition of one rotational speed increase detector that is required as an additional cost. Thus, the present invention is extremely economical.

What is claimed is:

1. A plurality of pump-turbines sharing conduits wherein an upper reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a load is rejected, said guide vanes are closed in a relatively rapid manner at the beginning and thereafter shift to a predetermined slow closing at least once, characterized in that at least a first pump-turbine out of the plural pump-turbines is provided with a rotational speed increase detector, and when it is detected that the rotational speed of said first pump-turbine has exceeded a second predetermined value higher than a rated speed, a command is issued also to at least one of the plural pump-turbines other than said first pump-turbine to limit the guide vane closing speed to a speed approximately equal to or lower than the speed after the shift to said slow closing in said pump-turbine.

2. A plurality of pump-turbines sharing conduits according to claim 1, wherein said second predetermined value is set above the range of rotational speed variations which can occur during the normal power generating operation in a connected state of the pump-turbines to an electric power system.

3. A plurality of pump-turbines sharing conduits wherein an upper reservoir-side conduit or a lower reservoir-side conduit is branched in the vicinity of pump-turbines ends, the conduit portions located farther than the branch points are shared among the pump-turbines, the pump-turbines are provided with guide vanes, and there is adopted a multi-stage closing method for the guide vanes such that when a load is rejected, said guide vanes are closed in a relatively rapid manner at the beginning and thereafter shift to a predetermined slow closing at least once, characterized in that at least a first pump-turbine out of the plural pump-turbines is provided with a detector which inputs at least a rotational speed, and when said detector has detected that said first pump-turbine is in a range influenced by an S-characteristic determined by the equation dQ1/dN1>0, where Q1=Q/√H, N1=N/√H, and wherein Q is turbine discharge, N is rotational speed and H is effective head, a command is issued also to at least one of said plural pump-turbines other than said first pump-turbine to limit the guide vane closing speed to a speed approximately equal to or lower than the speed after the shift to said slow closing in said pump-turbine.

4. A plurality of pump-turbines sharing conduits wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a load is rejected, said guide vanes are closed in a relatively rapid manner at the beginning and thereafter shift to a predetermined slow closing at least once, characterized in that the plural pump-turbines are each provided with a rotational speed increase detector, and when it is detected that the rotational speed of the associated pump-turbine has exceeded a second predetermined value higher than a rated speed, a command is issued also to each of the other pump-turbines than said pump-turbine to limit the guide vane closing speed to a speed approximately equal to or lower than the speed after the shift to said slow closing.

5. A plurality of pump-turbines sharing conduits wherein an upper reservoir-side conduit or lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a full load or a large load close thereto is rejected, the guide vanes are closed in a relatively rapid manner at the beginning and thereafter shift to a predetermined slow closing at least once, characterized in that said plural pump-turbines are each provided with a detector which inputs at least a rotational speed to check whether each pump-turbine is in a range influenced by an S-characteristic determined by the equation dQ1/dN1>0, where Q1=Q/√H, N1=N√H, and wherein Q is turbine discharge, N is rotational speed and H is effective head, and if the answer is affirmative, a command is issued also to each of the other pump-turbines than said pump-turbine concerned to limit the guide vane closing speed in each said pump-turbine to a speed approximately equal to or lower than the speed after the shift to said slow closing.

6. A plurality of pump-turbines sharing conduits wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a full load or a large load close thereto is rejected, the guide vanes are closed in a relatively rapid manner at the beginning and thereafter shift to a predetermined slow closing at least once, characterized in that at least a first pump-turbine out of said plural pump-turbines is provided with a rotational speed increase detector, and when it is detected that the rotational speed of said first pump-turbine has exceeded a second predetermined value higher than a rated speed, the guide vane closing speed of the pump-turbine concerned is limited to a speed approximately equal to or lower than the speed after the shift to said slow closing, while a command is issued to at least one of the pump-turbines other than said first pump-turbine to limit the guide vane closing speed in said pump-turbine to a speed approximately equal to or lower than the speed after the shift to said slow closing.

7. A plurality of pump-turbines sharing conduits wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a full load or a large load close thereto is rejected, the guide vanes are closed in a relatively rapid manner at the beginning and thereafter shift to a predetermined slow closing at least once, characterized in that at least a first pump-turbine out of the plural pump-turbines is provided with a detector which inputs at least a rotational speed, and when said detector has detected that said first pump-turbine is in a range influenced by an S-characteristic determined by the equation dQ1/dN1>0, where Q1=Q/√H, N1=N√H, and wherein Q is turbine discharge, N is rotational speed and H is effective head, the guide vane closing speed in the pump-turbine concerned is limited to a speed approximately equal to or lower than the speed after the shift to said slow closing, while a command is issued also to at least one of the pump-turbines other than said first pump-turbine to limit the guide vane closing speed in said pump-turbine to a speed approximately equal to or lower than the speed after the shift to said slow closing.

8. A plurality of pump-turbines sharing conduits wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a full load or a large load close thereto is rejected, the guide vanes are closed in a relatively rapid manner at the beginning and thereafter shift to a predetermined slow closing at least once, characterized in that when it is detected that the rotational speed of at least a first pump-turbine out of the other pump-turbines has exceeded a second predetermined value higher than a rated speed, the guide vane closing speed in the pump-turbine concerned is limited to a speed approximately equal to or lower than the speed after the shift to said slow closing in accordance with the detected signal.

9. A plurality of pump-turbines sharing conduits wherein an upper reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a full load or a large load close thereto is rejected, the guide vanes are closed in a relatively rapid manner at the beginning and thereafter shift to a predetermined slow closing at least one characterized in that when at least a first pump-turbine out of said plural pump-turbines is following at least an S-characteristic determined by the equation dQ1/dN1>0, where Q1=Q/√H, N1=N√H, and wherein Q is turbine discharge, N is rotational speed and His effective head, in a flow rate decreasing direction the guide vane closing speed in at least one of said plural pump-turbines other than said first pump-turbine is also limited to a speed approximately equal to or lower than the speed after the shift to said slow closing.

10. A plurality of pump-turbines sharing conduits wherein an upper reservoir-side conduit or a lower reservoir-side conduit or a lower reservoir-side conduit is branched in the vicinity of pump-turbine ends, the conduit portions located farther than the branch points are shared among the pump-turbines, the pump-turbines are each provided with guide vanes, and there is adopted a multi-stage closing method for the guide vanes such that when a full load or a large load close thereto is shut down, the guide vanes are closed in a relatively rapid manner at the beginning and thereafter shift to a predetermined slow closing at least once, characterized in that there is provided an S-characteristic descent detector for detecting that at least a first pump-turbine out of said plural pump-turbines is following at least an S-characteristic determined by the equation $dQ1/dN1>0$, where $Q1=Q/\sqrt{H}$, $N1=N\sqrt{H}$, and wherein Q is turbine discharge, N is rotational speed and H is effective head, in a flow rate decreasing direction and upon operation of said S-characteristic decent detector, a command is issued to at least one of said plural pump-turbines other than said first pump-turbine to limit the guide vane closing speed in said pump-turbine to a speed equal to or lower than the speed after the shift to said slow closing.

11. A plurality of pump-turbines sharing conduits according to claim 10, wherein there is provided an S-characteristic descent detector for detecting that the first pump-turbine is following the S-characteristic in a flow rate decreasing direction on the basis of an AND condition of $dN/dt<0$ and $d^2 N/dt^2<0$, and upon operation of said S-characteristic descent detector, a command is issued also to at least one of said plural pump-turbines other than said first pump-turbine to limit the guide vane closing speed in said pump-turbine to a speed approximately equal to or lower than the speed after the shift to said slow closing.

* * * * *